US012354865B2

(12) United States Patent
Verenchikov

(10) Patent No.: US 12,354,865 B2
(45) **Date of Patent: *Jul. 8, 2025**

(54) MULTI-PASS MASS SPECTROMETER

(71) Applicant: Micromass UK Limited, Wilmslow (GB)

(72) Inventor: Anatoly Verenchikov, City of Bar (ME)

(73) Assignee: Micromass UK Limited, Wilmslow (GB)

( * ) Notice: Subject to any disclaimer, the term of this patent is extended or adjusted under 35 U.S.C. 154(b) by 98 days.

This patent is subject to a terminal disclaimer.

(21) Appl. No.: 18/324,421

(22) Filed: May 26, 2023

(65) Prior Publication Data

US 2023/0386818 A1 Nov. 30, 2023

Related U.S. Application Data

(63) Continuation of application No. 17/539,599, filed on Dec. 1, 2021, now Pat. No. 11,705,320, which is a (Continued)

(30) Foreign Application Priority Data

Aug. 6, 2017 (GB) ..................................... 1712612
Aug. 6, 2017 (GB) ..................................... 1712613
(Continued)

(51) Int. Cl.
*H01J 49/40* (2006.01)
*H01J 49/42* (2006.01)

(52) U.S. Cl.
CPC .......... *H01J 49/406* (2013.01); *H01J 49/403* (2013.01); *H01J 49/4225* (2013.01)

(58) Field of Classification Search
CPC ........ H01J 49/04; H01J 49/401; H01J 49/403; H01J 49/406; H01J 49/408; H01J 49/42; H01J 49/4225
See application file for complete search history.

(56) References Cited

U.S. PATENT DOCUMENTS 5,869,829 A * 2/1999 Dresch .................... H01J 49/40 250/282
11,211,238 B2 * 12/2021 Verenchikov ........... H01J 49/04
(Continued)

*Primary Examiner* — David E Smith
(74) *Attorney, Agent, or Firm* — Goodwin Procter LLP

(57) ABSTRACT

Improved multi-pass time-of-flight mass spectrometers MPTOF, either multi-reflecting (MR) or multi-turn (MT) TOF are proposed with elongated pulsed converters—either orthogonal accelerator or radially ejecting ion trap. The converter 35 is displaced from the MPTOF s-surface of isochronous ion motion in the orthogonal Y-direction. Long ion packets 38 are pulsed deflected in the transverse Y-direction and brought onto said isochronous trajectory s-surface, this way bypassing said converter. Ion packets are isochronously focused in the drift Z-direction within or immediately after the accelerator, either by isochronous trans-axial lens/wedge 68 or Fresnel lens. The accelerator is improved by the ion beam confinement within an RF quadrupolar field or within spatially alternated DC quadrupolar field. The accelerator improves the duty cycle and/or space charge capacity of MPTOF by an order of magnitude.

18 Claims, 12 Drawing Sheets

Related U.S. Application Data continuation of application No. 16/636,946, filed as application No. PCT/GB2018/052103 on Jul. 26, 2018, now Pat. No. 11,211,238.

(30) Foreign Application Priority Data

| | | |
|---|---|---|
| Aug. 6, 2017 | (GB) | 1712614 |
| Aug. 6, 2017 | (GB) | 1712616 |
| Aug. 6, 2017 | (GB) | 1712617 |
| Aug. 6, 2017 | (GB) | 1712618 |
| Aug. 6, 2017 | (GB) | 1712619 |

(56) References Cited

U.S. PATENT DOCUMENTS

| | | | | |
|---|---|---|---|---|
| 11,705,320 | B2 * | 7/2023 | Verenchikov | H01J 49/04 250/287 |
| 2001/0011703 | A1 * | 8/2001 | Franzen | H01J 49/401 250/287 |
| 2004/0164239 | A1 * | 8/2004 | Franzen | H01J 49/0031 250/288 |
| 2004/0183007 | A1 * | 9/2004 | Belov | H01J 49/401 250/282 |
| 2011/0168880 | A1 * | 7/2011 | Ristroph | H01J 49/406 250/282 |
| 2015/0090873 | A1 * | 4/2015 | Brown | G01N 27/623 250/281 |
| 2015/0279650 | A1 * | 10/2015 | Verenchikov | H01J 49/406 250/282 |

* cited by examiner

MULTI-PASS MASS SPECTROMETER

CROSS-REFERENCE TO RELATED APPLICATIONS

This application is a continuation of U.S. patent application Ser. No. 17/539,599, filed on Dec. 1, 2021, which is a continuation U.S. patent application Ser. No. 16/636,946, filed on Feb. 6, 2020, which is a U.S. national phase filing under 35 U.S.C. § 371 claiming the benefit of and priority to International Patent Application No. PCT/GB2018/052103, filed on Jul. 26, 2018, which claims priority from and the benefit of United Kingdom patent application No. 1712612.9, United Kingdom patent application No. 1712613.7, United Kingdom patent application No. 1712614.5, United Kingdom patent application No. 1712616.0, United Kingdom patent application No. 1712617.8, United Kingdom patent application No. 1712618.6 and United Kingdom patent application No. 1712619.4, each of which was filed on Aug. 6, 2017. The entire contents of these applications are incorporated herein by reference.

FIELD OF INVENTION

The invention relates to the area of time of flight mass spectrometers, multi-turn and multi-reflecting time-of-flight mass spectrometers, and embodiments are particularly concerned with improved sensitivity and space charge capacity of pulsed converters.

BACKGROUND

Time-of-flight mass spectrometers (TOF MS) are widely used in combination with continuous ion sources, like Electron Impact (EI), Electrospray (ESI), Inductively coupled Plasma (ICP) and gaseous Matrix Assisted Laser Desorption and Ionization (MALDI). To convert intrinsically continuous ion source into pulsed ion packets there have been employed such methods of pulsed conversion as orthogonal acceleration (OA), radiofrequency (RF) ion guides with axial ion ejection and RF ion traps with radial pulsed ejection.

Initially, the orthogonal accelerator (OA) method was introduced by Bendix corporation as described in G. J. O'Halloran et. al, Report ASD-TDR-62-644, The Bendix Corporation, Research Laboratory Division, Southfield, MI, 1964. Dodonov et. al. SU1681340 and WO9103071 reintroduced the OA injection method and improved the method by using an ion mirror to compensate for multiple inherent OA aberrations. The ion beam propagates in the drift Z-direction through a storage gap between plate electrodes. Periodically, an electrical pulse is applied between the plates. A portion of continuous ion beam, in the storage gap, is accelerated in an orthogonal X-direction, thus forming ribbon-shaped ion packets. Due to conservation of initial Z-velocity, the ion packets drift slowly in the Z-direction, thus traveling within the TOF MS along an inclined mean ion trajectory, get reflected by the ion mirror and finally reach a detector.

For improving the duty cycle of pulsed conversion there were proposed various radio-frequency ion traps with either axial ion ejection as in U.S. Pat. Nos. 6,020,586 and 6,872,938, or radial ion ejection as in U.S. Pat. Nos. 6,545,268, 8,373,120, and 8,017,909. Ions are admitted into a radio-frequency ion guide, typically quadrupolar, and are transverse confined by an RF field. Ions are locked axially by various types of DC plugs, get dampened in gas collisions at gas pressures of about 1 to 10 mTorr, and are ejected by pulsed electric field, either axially or radially. Radial traps have much higher space charge capacity, but the trap length is still limited so that the ion packet can bypass the trap after the ion mirror reflection.

In last two decades, the resolution of TOF MS instruments has been substantially improved by using multi-pass TOFMS (MPTOF). MP TOF instruments may either have ion mirrors for multiple ion reflections (i.e. may be a multi-reflecting TOF (MRTOF) such as that described in SU1725289, U.S. Pat. Nos. 6,107,625, 6,570,152, GB2403063, U.S. Pat. No. 6,717,132), or may have electrostatic sectors for multiple ion turns (i.e. may be a multi-turn TOF (MTTOF) such as that as described in U.S. Pat. Nos. 7,504,620, 7,755,036, and M. Toyoda, et. al., J. Mass Spectrom. 38 (2003) 1125, incorporated herein by reference. The term "pass" generalizes ion mirror reflection in MRTOF and ion turn in MTTOF. The resolving power of MP-TOF grows at larger number of passes N. However, arranging a conventional OA in MP-TOF, as in U.S. Pat. Nos. 6,717,132 and 7,504,620, limits the efficiency of pulsed conversion of the OA, elsewhere called duty cycle. To avoid spectral overlaps, the duty cycle of MP-TOF having an OA is limited to under $DC<J/N$ for heaviest ions, and realistically $DC<1/2N$, accounting for spatial rims of the OA and detector, and drops further as the square root of specific ion mass $\mu=m/z$ for lighter ions (see eq. 3 below).

WO2016174462 proposes increasing the OA length and duty cycle by displacing the OA from the central path of MR-TOF and arranging ion oscillations around the symmetry plane of isochronous trajectory. However, operation off the isochronous plane may affect the resolution and the spatial ion focusing of the MRTOF analyzer.

It is desired to improve the duty cycle of orthogonal accelerators for multi pass TOF mass spectrometers without affecting MPTOF resolution.

SUMMARY

From a first aspect the present invention provides a time-of-flight mass analyser comprising: at least one ion mirror and/or sector for reflecting or turning ions in a first dimension (X-dimension); an ion accelerator for pulsing ion packets into the ion mirror or sector;

an ion detector; and focusing electrodes arranged and configured to control the motion of ions in a second dimension (Z-dimension) orthogonal to the first dimension so as to spatially focus each of the ion packets so that it is smaller, in the second dimension, at the detector than when pulsed out of the ion accelerator.

By focusing the ions, embodiments of the invention ensure that the ions are received at the active area of the detector with high efficiency. Focusing the ions also prevents different ions from undergoing significantly different flight path lengths (e.g. performing different numbers of reflections or turns in MPTOF embodiments) before being detected.

The length of the ion accelerator from which ions are pulsed may be longer, in the second dimension, than the region of the detector over which ions are capable of being detected (i.e. the active area of the detector).

The focusing electrodes may be configured to isochronously focus the ions in the second dimension to the ion detector; and/or the focusing electrodes may be configured to focus the ions onto the detector such that the times of flight of the ions from the ion accelerator to the detector are independent of the positions of the ions, in the second dimension, within the ion packet.

The focusing electrodes may compensate time aberrations across the ion packet width.

The focusing electrodes may be configured to impart ions located at different positions, in the second dimension, within the ion packet with different velocities in the second dimension so as to perform the spatial focusing.

The focusing electrodes may comprise a plurality of electrodes configured to generate an electric field region through which ions travel in use that has equipotential field lines that curve (and/or diverge) as a function of position along the second dimension (Z-direction) so as to focus ions in the second dimension.

The equipotential field lines may curve (and/or diverge) in a plane defined by the first and second dimensions (X-Z plane).

The mass analyser may comprise focusing electrodes that are spaced apart from each other in the first dimension by a gap, wherein the gap is elongated in the second dimension and the longitudinal axis of the gap curves in a plane defined by the first and second dimensions (X-Z plane).

Such focusing electrodes may perform their focusing function whilst being relatively thin in a third dimension (Y-dimension) orthogonal to both the first and second dimensions. This is useful in embodiments where the ions are displaced in the third dimension so as to avoid ions impacting on ion-optical components.

The ion accelerator may comprise a puller electrode configured to pull ions in the first dimension when pulsing ion packets in the first dimension; wherein the puller electrode is curved in the plane defined by the first and second dimensions (X-Z plane) and in the opposite direction to the curvature of the focusing electrodes.

The use of such a curved puller electrode allows reverting the sign of the overall T|ZZ aberration, i.e. the pull curvature radius or the focal distance of the curved focusing electrodes may be optimized for complete mutual compensation of T|ZZ aberrations.

The focusing electrodes may comprise a plurality of ion deflectors arranged such that different portions of an ion packet pass through different ones of the ion deflectors, and the ion deflectors may be configured to deflect the mean trajectories of the different portions of the ion packet by different amounts so as to focus the ion packet in the second dimension.

The deflectors may operate as a Fresnel lens.

Each ion deflector may comprise a pair of deflection electrodes that are spaced apart in the second dimension, and through which a portion of the ion packet passes in use.

The ion deflectors may be arranged in an array along the second dimension.

The adjacent deflection electrodes of adjacent deflectors, in the second dimension, may be maintained at substantially equal and opposite potentials for minimising long term fields.

The focusing electrodes may be arranged within the ion accelerator or downstream of the ion accelerator, e.g. immediately downstream of the ion accelerator.

The focusing electrodes may comprise a plurality of electrodes configured to control the velocities of the ions such that ions within the ion accelerator have velocities, in the second dimension, that decrease as a function of distance in the second dimension towards the detector.

The plurality of electrodes may comprise an ion guide or ion trap upstream of the ion accelerator and one or more electrodes configured to pulse ions out of the ion guide or ion trap such that the ions arrive at the ion accelerator at different times and with velocities in the second dimension that increase as a function of the time at which they arrive at the accelerator.

The ion guide or ion trap may be an RF ion guide or RF ion trap.

Voltages may be applied to one or more electrodes of the ion guide or ion trap (or radially surrounding electrodes) so as to pulse the ions out of the ion guide or ion trap. For example, the ion guide or ion trap may be formed from a segmented multipole (e.g. quadrupole) or ion tunnel (i.e. a series of apertured electrodes) and voltages may be applied to electrodes of these devices so as to pulse ions out of the ion guide or ion trap.

Additionally, or alternatively, a gate electrode may be provided between the ion guide or ion trap and the ion accelerator, and a pulsed voltage may be applied to the gate electrode for pulsing ions out of the ion guide or ion trap.

Additionally, or alternatively, the floating voltages of the ion guide or ion trap and an ion optical component arranged between the ion accelerator and the ion guide or ion trap may be controlled with time so as to pulse the ions out of the ion guide or ion trap (i.e. a field free elevator). These embodiments allow a relatively wide range of mass to charge ratios to be mass analysed.

The mass analyser may comprise a controller that synchronises the pulsing of ions out of the ion guide or ion trap with the pulsing of ion packets out of the ion accelerator, wherein the controller is configured to provide a time delay between the pulsing of ions out of the ion guide or ion trap and the pulsing of ion packets out of the ion accelerator, wherein the time delay is set based on a predetermined range of mass to charge ratios of interest to be mass analysed.

For example, the predetermined range may be a range input into a user interface of the spectrometer. These embodiments are attractive for target mass analysis, where a narrow mass range may be selected intentionally selected.

The plurality of electrodes may comprise electrodes arranged within the ion accelerator to generate an axial potential distribution along the second dimension that slows ions by different amounts depending on their location, in the second dimension, within the ion accelerator.

These embodiments may be achieved by arranging the plurality of electrodes along the second dimension connected together via a resistive divider and to a voltage supply. These embodiments enable the entire mass range within the ion accelerator to be focused and analysed.

The ion accelerator may comprise an ion receiving portion having electrodes arranged to receive ions travelling along a first direction, wherein said first direction is tilted at an acute angle to the second dimension.

The first direction may be tilted in the plane defined by the first and second dimensions (X-Y plane).

The mass analyser may comprise an ion deflector located downstream of said ion accelerator, and that is configured to back-steer the average ion trajectory of the ions, in the second direction. The ion deflector may be arranged to back-steer the average ion trajectory of the ions by the same angle as the angle of tilt between the first direction and the second dimension.

Alternatively, or additionally, in the embodiments having the equipotential field lines that curve (and/or diverge), the curvature (and/or divergence) of the field lines may be arranged to back-steer the average ion trajectory of the ions.

Alternatively, or additionally, in the embodiments having the plurality of ion deflectors, the ion deflectors may be arranged to back-steer the average ion trajectory of the ions.

These tilted embodiments enables the energy of the ions received at the ion accelerator to be increased, thus reducing the energy spread of the ions Alternatively, the ion accelerator may have electrodes arranged to receive ions travelling along a first direction, wherein said first direction is parallel to the second dimension.

The ion accelerator comprises a pulsed voltage supply configured to apply a pulsed voltage to at least one electrode of the ion accelerator for pulsing ions out of the ion accelerator in the first dimension.

The ion accelerator may comprise an ion guide portion having electrodes arranged to receive ions, and one or more voltage supplies configured to apply potentials to these electrodes for confining ions in at least one dimension (X- or Y-dimension) orthogonal to the second dimension.

The voltage supplies may be DC and/or RF voltage supplies.

The ion accelerator may comprises: an ion guide portion having electrodes arranged to receive ions travelling along a first direction (Z-dimension), including a plurality of DC electrodes spaced along the first direction; and DC voltage supplies configured to apply different DC potentials to different ones of said DC electrodes such that when ions travel through the ion guide portion along the first direction they experience an ion confining force, generated by the DC potentials, in at least one dimension (X- or Y-dimension) orthogonal to the second dimension.

The DC electrodes and DC voltage supplies generate an electrostatic field that spatially varies along the second dimension. As such, the ions travelling along the second dimension experience different forces at different distances along the second dimension. This enables the ions to be confined by the DC potentials in an effective potential well that may be independent of the mass to charge ratios of the ions.

The ion confining force generated by the DC potentials desirably confines ions in the first dimension (X-dimension). This may improve the initial spatial distribution of the ions for pulsing in the first dimension (X-dimension).

The DC voltage supplies may be configured to apply different DC potentials to different ones of said DC electrodes such that when ions travel through the ion guide portion along the first direction they experience an ion confining force generated by the DC potentials in both dimensions (X- and Y-dimensions) orthogonal to the second dimension.

Embodiments of the ion guide portion enable the pulsed ion accelerator to be relatively long in the second dimension, whilst having relatively low ion losses, ion beam spreading and surface charging of the electrodes of the ion accelerator.

The ion confinement may be performed without the use of resonant RF circuits, and can be readily switched on and off. More specifically, the use of DC potentials to confine the ions in the ion guide portion enables embodiments to switch off the confining potentials relatively quickly (as opposed to RF confinement voltages), e.g. just before the pulsed ion ejection. Also, the pulsed voltage for ejecting ions does not excite the DC ion confinement electrodes in the detrimental manner that it would with RF confinement electrodes.

The provision of the DC electrodes spaced along the second dimension enables the strength and shape of the DC confining field to be set up to vary along the first direction of the ion guide portion, e.g. to provide an axial gradient, a slight wedge or curvature of the confining field, without constructing complex RF circuits.

The pulsed ion accelerator may be an orthogonal accelerator.

The ions may enter into the pulsed ion accelerator along the first direction.

The ion guide portion may comprise a first pair of opposing rows of said DC electrodes on opposing sides of the ion guide portion, wherein each row extends in the second dimension (Z-dimension), and wherein the DC voltage supplies are configured to maintain at least some of the adjacent DC electrodes in each row at potentials having opposite polarities. Each electrode in a given row may be maintained at an opposite polarity to the opposing electrode in the other row, i.e. each electrode in a given row may be maintained at an opposite polarity to the electrode having the same location (in the second dimension) in the opposing row.

The ion guide portion may comprise a second pair of opposing rows of said DC electrodes on opposing sides of the ion guide portion, wherein each row extends in the second dimension (Z-dimension), and wherein the DC voltage supplies are configured to maintain at least some of the adjacent DC electrodes in each row at potentials having opposite polarities. Each electrode in a given row of the second pair may be maintained at an opposite polarity to the opposing electrode in the other row of the second pair, i.e. each electrode in a given row of the second pair may be maintained at an opposite polarity to the electrode having the same location (in the second dimension) in the opposing row of the second pair.

Ions may be received in the ion guide portion in the region radially inward of (and defined by) the first and second pairs of rows.

The DC voltage supplies may be configured to maintain the DC electrodes at potentials so as to form an electrostatic quadrupolar field in the plane orthogonal to the second dimension, wherein the polarity of the quadrupolar field alternates as a function of distance along the second dimension.

The DC electrodes may be arranged to form a quadrupole ion guide that is axially segmented in the second dimension, and wherein the DC voltage supplies are configured to maintain DC electrodes that are axially adjacent in the second dimension at opposite polarities, and DC electrodes that are adjacent in a direction orthogonal to the second dimension at opposite polarities.

The DC quadrupolar field may spatially oscillate in the second dimension.

The DC electrodes may have the same lengths in the second dimension and may be periodically spaced along the second dimension.

The DC electrodes may be arranged on one or more printed circuit board (PCB), insulating substrate, or insulating film. For example, each of the rows of DC electrodes may be arranged on a respective printed circuit board, insulating substrate, or insulating film. Alternatively, two of the rows of DC electrodes may be arranged on two opposing sides of a PCB, insulating substrate, or insulating film. Alternatively, two of the rows of DC electrodes may be arranged on different layers of a multi-layer PCB or insulating substrate.

The PCB(s), insulating substrate(s), or insulating film(s) may comprise a conductive coating (e.g. in the regions that the electrodes do not contact) to prevent charge build up due to ion strikes.

It may be desired to increase the ion confining force as a function of distance in the second dimension, e.g. so that the amplitude of oscillation of the ions (e.g. micro-motion)

orthogonal to the second dimension is (gradually) reduced as a function of distance along the ion guide portion. For example, the DC voltage supplies may be configured to apply different DC voltages to the DC electrodes so as to form a voltage gradient in the second dimension that increases the ion confining force as a function of distance in the second dimension. This may be achieved by connecting the DC electrodes aligned in the first direction using resistive dividers. For the avoidance of doubt, said function of distance in the second dimension is the distance away from the ion entrance to the ion guide portion.

The DC electrodes may be arranged in rows that are spaced apart in at least one dimension orthogonal to the second dimension for confining the ions between the rows, and wherein the DC electrodes are spaced apart in said at least one dimension by an amount that decreases as a function of distance in the second dimension.

The spacing between the DC electrodes in said at least one dimension may decrease as a function of distance in the second dimension from the ion entrance at a first end of the ion guide portion to a downstream portion.

The spacing between the DC electrodes in said at least one dimension may be maintained constant from the downstream portion at least part of the distance to a second end of the ion guide portion.

The at least one dimension may be the dimension (Y-dimension) orthogonal to both the second dimension (Z-dimension) and the first dimension (X-dimension).

The ion accelerator may be configured to control the DC voltage supplies to switch off at least some of said DC potentials applied to the DC electrodes and then subsequently control the pulsed voltage supply to apply the pulsed voltage for pulsing ions out of the ion accelerator; and/or the pulsed ion accelerator may be configured to control the DC voltage supplies to progressively reduce the amplitudes of the DC potentials applied to the DC electrodes with time, and then subsequently control the pulsed voltage supply to apply the pulsed voltage for pulsing ions out of the ion accelerator.

The ion accelerator may repeatedly (and optionally periodically) pulse ions out, and prior to each pulse may switch off the DC potentials applied to the DC electrodes. Alternatively, or additionally, the ion accelerator may repeatedly (and optionally periodically) pulse ions out, and prior to each pulse may progressively reduce the amplitudes of the DC potentials applied to the DC electrodes with time.

The above embodiments may reduce the micro-motion of the ions within the confined ion beam before pulsed ejection.

The ion accelerator may comprise pulsed electrodes spaced apart in the first dimension (X-dimension) on opposite sides of the ion guide portion, at least one of which is connected to the pulsed voltage supply for pulsing ions in the first dimension (X-dimension).

The pair of pulses electrodes may comprise at least one push electrode connected to the pulsed voltage supply for pulsing ions away from the at least one push electrode, out of the ion guide portion, and out of the ion accelerator; and/or at least one puller electrode connected to the pulsed voltage supply for pulsing ions towards the at least one puller electrode, out of the ion guide portion, and out of the ion accelerator.

The at least one puller electrode may have a slit therein, or may be formed from spaced apart electrodes, so as to allow the pulsed ions to pass therethrough.

The ion accelerator may comprise electrodes spaced apart in the first dimension (X-dimension) on opposite sides of the ion guide portion; wherein these electrodes are spaced apart in said first dimension (X-dimension) by an amount that decreases as a function of distance in the first direction.

These electrodes may be the pulsed electrodes described above.

The spacing between the electrodes in said first dimension (X-dimension) may decrease as a function of distance in the first direction from the ion entrance at a first end of the ion guide portion to a downstream portion. The spacing between the electrodes in said first dimension (X-dimension) may be maintained constant from the downstream portion at least part of the distance to a second end of the ion guide portion.

The ion accelerator may comprise electrodes spaced apart in the first dimension (X-dimension) on opposite sides of the ion guide portion; wherein the average DC potential of said DC potentials is negative relative to said electrodes spaced apart in the first dimension so as to form a quadrupolar field that compresses the ions in the first dimension (X-dimension). Said electrodes spaced apart in the first dimension may be the pulsed electrodes described above.

The ion accelerator may comprise electrodes and voltage supplies forming a DC ion acceleration field arranged downstream of the ion guide portion, in the first dimension (X-dimension).

The mass analyser may be a multi-pass time-of-flight mass analyser having electrodes arranged and configured so as to provide an ion drift region that is elongated in the second dimension and to reflect or turn ions multiple times in the first dimension.

The mass analyser may be a multi-reflecting time of flight mass analyser having two ion mirrors that are elongated in the second dimension (z-dimension) and configured to reflect ions multiple times in the first dimension (x-dimension), wherein the ion accelerator is arranged to receive ions and accelerate them into one of the ion mirrors. Alternatively, the mass analyser may be a multi-turn time of flight mass analyser having at least two electric sectors configured to turn ions multiple times in the first dimension (x-dimension), wherein the pulsed ion accelerator is arranged to receive ions and accelerate them into one of the sectors.

Where the mass analyser is a multi-reflecting time of flight mass analyser, the mirrors may be gridless mirrors.

Each mirror may be elongated in the second dimension and may be parallel to the second dimension.

It is alternatively contemplated that the multi-pass time-of-flight mass analyser may have one or more ion mirror and one or more sector arranged such that ions are reflected multiple times by the one or more ion mirror and turned multiple times by the one or more sector, in the first dimension.

The electrodes may be arranged and configured to reflect or turn ions multiple times between the ion mirrors or sectors in an oscillation plane defined by the first and second dimensions as the ions drift in the second dimension, wherein the ion accelerator is displaced from said oscillation plane in a third dimension (Y-dimension) orthogonal to the first and second dimensions, and may further comprise: either (i) a first ion deflector arranged and configured to deflect ions pulsed from the ion accelerator, in the third dimension, towards said oscillation plane; and a second ion deflector arranged and configured to deflect ions received from the first deflector so as that the ions travel in said oscillation plane; or (ii) one or more electric sector arranged and configured to guide ions pulsed from the ion accelerator, in the third dimension, towards and into said oscillation plane.

The first and/or second ion deflector may be a pulsed ion deflector connected to a pulsed voltage supply.

This enables the deflector(s) to be switched off once the ions are in the oscillation plane.

The use of pulsed deflector(s) enables the mass to charge ratio range transmitted through the mass analyser to be selected based on the pulse duration of the deflector(s).

However, it is contemplated that at least the first ion deflector may be connected to a voltage supply such that it is an electrostatic deflector.

The oscillation plane may be an isochronous surface of mean ion trajectory within the fields of the (isochronous electrostatic) mass analyser.

The length of the ion accelerator from which ions are pulsed (Lz) may be longer, in the second dimension, than half of the distance (Az) that the ion packet advances for each mirror reflection or sector turn.

In other words, $Lz>Az$.

The ratio LZ/AZ may be: (i) $0.5<LZ/AZ<1$; (ii) $1<LZ/AZ<2$; (iii) $2<LZ/AZ<5$; (iv) $5<LZ/AZ<10$; (v) $10<LZ/AZ<20$; and (vi) $20<LZ/AZ<50$.

This improves the duty cycle of the mass analyser.

The length of the ion accelerator from which ions are pulsed (Lz) may be longer, in the second dimension, than x % of the distance in the second dimension between the entrance to the ion accelerator and the midpoint of the detector, wherein X is: ≥10, ≥15, ≥20, ≥25, ≥30, ≥35, ≥40, ≥45, or ≥50.

The mass analyser may further comprise an ion deflector located downstream of said ion accelerator, and that is configured to back-steer the average ion trajectory of the ions, in the second dimension, thereby tilting the angle of the time front of the ions received by this ion deflector.

The average ion trajectory of the ions travelling through the ion deflector may have a major velocity component in the first dimension (x-dimension) and a minor velocity component in the second dimension. The ion deflector back-steers the average ion trajectory of the ions passing therethrough by reducing the velocity component of the ions in the second dimension. The ions may therefore continue to travel in the same drift direction upon entering and leaving the ion deflector, but with the ions leaving the ion deflector having a reduced velocity in the drift direction. This enables the ions to oscillate a relatively high number of times in the first dimension, for a given length in the second dimension, thus providing a relatively high resolution.

The ion deflector may be configured to generate a substantially quadratic potential profile in the second dimension.

The ion accelerator and ion deflector may tilt the time front so that it is aligned with the ion receiving surface of the ion detector and/or to be parallel to the second dimension (z-dimension).

The mass analyser may be an isochronous and/or gridless mass analyser.

The mass analyser may be configured to form an electrostatic field in a plane defined by the first dimension and the dimension orthogonal to both the first and second dimensions (i.e. the XY-plane). This two-dimensional field may have a zero or negligible electric field component in the second dimension (in the ion passage region). This two-dimensional field may provide isochronous repetitive multi-pass ion motion along a mean ion trajectory within the XY plane.

The energy of the ions received at the ion accelerator and the average back steering angle of the ion deflector may be configured so as to direct ions to an ion detector after a pre-selected number of ion passes (i.e. reflections or turns).

The spectrometer disclosed herein may comprise an ion source. The ion source may generate an substantially continuous ion beam or ion packets.

The ion accelerator may receive a substantially continuous ion beam or packets of ions, and may pulse out ion packets. Alternatively, the ion accelerator may be a radio-frequency ion trap converter.

The pulsed ion accelerator may be a gridless orthogonal accelerator.

The second dimension may be linear or it may be curved, e.g. to form a cylindrical or elliptical drift region.

The mass analyser may have a size in the second dimension of: ≤1 m; ≤0.9 m; ≤0.8 m; ≤0.7 m; ≤0.6 m; or ≤0.5 m. The mass analyser or trap may have the same or smaller size in the first dimension and/or the dimension orthogonal to the first and second dimensions.

The mass analyser may provide an ion flight path length of: between 5 and 15 m; between 6 and 14 m; between 7 and 13 m; or between 8 and 12 m.

The mass analyser may provide an ion flight path length of: ≤20 m; ≤15 m; ≤14 m; ≤13 m; ≤12 m; or ≤11 m. Additionally, or alternatively, the mass analyser may provide an ion flight path length of: ≥5 m; ≥6 m; ≥7 m; ≥8 m; ≥9 m; or ≥10 m. Any ranges from the above two lists may be combined where not mutually exclusive.

The mass analyser may be configured to reflect or turn the ions N times in the oscillation dimension, wherein N is: ≥5; ≥6; ≥7; ≥8; ≥9; ≥10; ≥11; ≥12; ≥13; ≥14; ≥15; ≥16; ≥17; ≥18; ≥19; or ≥20. The mass analyser may be configured to reflect or turn the ions N times in the oscillation dimension, wherein N is: ≤20; ≤19; ≤18; ≤17; ≤16; ≤15; ≤14; ≤13; ≤12; or ≤11. Any ranges from the above two lists may be combined where not mutually exclusive.

The mass analyser may have a resolution of: ≥30,000; ≥40,000; ≥50,000; ≥60,000; ≥70,000; or ≥80,000.

The mass analyser may be configured such that the pulsed ion accelerator receives ions having a kinetic energy of: ≥20 eV; ≥30 eV; ≥40 eV; ≥50 eV; ≥60 eV; between 20 and 60 eV; or between 30 and 50 eV. Such ion energies may reduce angular spread of the ions and cause the ions to bypass the rims of the orthogonal accelerator.

The ion detector may be an impact ion detector that detects ions impacting on a detector surface. The detector surface may be parallel to the drift dimension.

The ion detector may be arranged between the ion mirrors or sectors, e.g. midway between (in the oscillation dimension) opposing ion mirrors or sectors.

The spectrometer may comprise an ion source and a lens system between the ion source and ion accelerator for telescopically expanding the ion beam from the ion source. The lens system may form a substantially parallel ion beam along the second dimension (Z-direction). The telescopic expansion may be used to optimise phase balancing of the ion beam within the ion guide portion, e.g. where the initial angular divergence and width of the ion beam provide for about equal impact onto the thickness of the confined ion beam.

The present invention also provides a time-of-flight mass spectrometer comprising a time-of-flight mass analyser as described herein.

The present invention also provides a method of mass spectrometry comprising: providing a mass analyser as claimed in any preceding claim; receiving ions in said ion accelerator; pulsing ions from said ion accelerator into said ion mirror or sector; and receiving ions at said detector; wherein the motion of ions in the second dimension (Z-dimension) is controlled using said focusing electrodes so as to spatially focus each of the ion packets so that it is smaller, in the second dimension, at the detector than when pulsed out of the ion accelerator.

An improved orthogonal accelerator is proposed for multi-pass time-of-flight mass spectrometers MPTOF, either multi-reflecting (MR) or multi-turn (MT) TOF. The orthogonal accelerator is elongated in the drift Z-direction and is displaced from the MPTOF surface of isochronous ion motion in the orthogonal Y-direction. Long ion packets are pulsed deflected in the transverse Y-direction and brought onto said isochronous trajectory surface, this way bypassing said orthogonal accelerator. Ion packets are isochronously focused in the drift Z-direction within or immediately after the accelerator, either by isochronous trans-axial or Fresnel lens and wedge. The accelerator is further improved by the ion beam confinement within an RF quadrupolar field or within spatially alternated DC quadrupolar field. The accelerator improves the duty cycle by an order of magnitude, accepts wide mass range in Pulsar mode and provides for crude mass selection at frequent accelerator pulsing at target mass analyses.

Similar method is adopted for coupling of RF ion traps with radial ion ejection. RF traps are elongated for larger space charge capacity. The trap is displaced from the plane of isochronous ion motion in MPTOF and ion packets are returned to the trajectory plane by pulsed displacement. Ion packets are spatially focused by isochronous lens to fit the detector size after multiple passes in MPTOF.

Embodiments of the invention provide a multi-pass MPTOF (multi-reflecting or multi-turn) time-of-flight mass spectrometer comprising:

(a) An ion source, generating an ion beam along a first drift Z-direction at some initial energy;
(b) An orthogonal accelerator, admitting said ion beam into a storage gap, pulsed accelerating a portion of said ion beam in the second orthogonal X-direction, thus forming ion packets with the major velocity component in the X-direction and with a relatively smaller velocity component in the Z-direction;
(c) An electrostatic multi-pass (multi-reflecting or multi-turn) time-of-flight mass analyzer (MPTOF), built of ion mirrors or electrostatic sectors, substantially elongated in the Z-direction to form an electrostatic field in an orthogonal XY-plane; said two-dimensional field provides for a field-free ion drift in the Z-direction towards a detector, and for an isochronous repetitive multi-pass ion motion within an isochronous mean ion trajectory s-surface—either symmetry s-XY plane of said ion mirrors or curved s-surface of electrostatic sectors;
(d) Wherein, the energy of said ion beam is chosen for arranging a desired advance $A_Z$ of the ion packets in the Z-direction per single pass—reflection or turn;
(e) Wherein the Z-length $L_Z$ of said orthogonal accelerator and length of ion packets are arranged to exceed at least half of said ion packet advance $L_Z>A_Z/2$;
(f) Wherein said orthogonal accelerator is displaced in the Y-direction from said isochronous mean ion trajectory s-surface to clear ion path;
(g) Deflectors or sectors, placed immediately after said orthogonal accelerator for pulsed displacing of said ion packets in the Y-direction to bring said ion packets onto said isochronous s-surface of mean ion trajectory; and
(h) Isochronous means for ion packet focusing in said Z-direction towards a detector, arranged either within or immediately after said orthogonal accelerator.

Preferably, for the purpose of ion beam spatial confinement, the pulsed gap of said orthogonal accelerator may further comprise at least one set of auxiliary electrodes, symmetrically surrounding said continuous beam; and wherein said auxiliary electrodes are at least one of the group: (i) side plates connected to radiofrequency (RF) signal; (ii) side plates connected to an attracting DC potential; (iii) segmented side plates connected to spatially alternated DC potentials; (iv) segmented DC dipoles connected to spatially alternated dipolar DC potentials; (v) segmented DC plates or DC dipoles with gradual rising of quadrupolar field in Z-axis and with gradual switch off in time, both arranged for spatial and temporal periods, corresponding to ions passing through at least two of said quadrupolar segments.

Preferably, said isochronous means for ion packet focusing in the Z-direction may comprise at least one means of the group: (i) a set of trans-axial lens and wedges; (ii) a Fresnel lens and wedge arranged in multi-segmented deflector.

Preferably, said ion packet focusing in the Z-direction is arranged by spatial-temporal correlation of ion beam parameters within said orthogonal accelerator by at least one means of the group: (i) pulsed acceleration of continuous ion beam in the Z-direction either within electrostatic channel or within a radio frequency RF ion guide, located upstream of said orthogonal accelerator; (ii) a time-variable floated elevator within an electrostatic channel or an RF ion guide, located upstream of said pulsed converter; (iii) a Z-dependent deceleration of ion beam within said orthogonal accelerator.

Embodiments of the invention provide a method of time-of-flight mass spectrometry comprising the following steps:

(a) Passing a continuous ion beam along the drift Z-direction through a storage gap of an orthogonal accelerator, having electrodes elongated in the Z-direction;
(b) Ejecting a portion of the ion beam by pulsed electrical field and DC accelerating fields, in an orthogonal X-direction, thus, forming ion packets; wherein said ion packets retain the ion beam velocity in the Z-direction and accelerated to much higher energy in the X-direction;
(c) Within an orthogonal to Z-direction XY-plane, arranging a two dimensional electrostatic field of ion mirrors or electrostatic sectors, forming electrostatic fields of multi-pass or multi-turn time-of-flight mass analyzers; said fields have zero component in the Z-direction for a free ion packet propagation in the Z-direction towards a detector; said fields are arranged for isochronous multi-pass ion motion within an isochronous mean ion trajectory s-surface—either symmetry s-XY plane of ion mirrors or curved s-surface of electrostatic sectors;
(d) Selecting an initial energy of said ion beam to control an ion packet advance $A_Z$ in the Z-direction per single pass—reflection or turn;
(e) Arranging the Z-length of said orthogonal accelerator and Z-length of said ion packets $L_Z$ exceeding at least half of said ion packet advance $A_Z$ per single pass $L_Z>A_Z/2$;
(f) Displacing said orthogonal accelerator in the Y-direction from said isochronous mean ion trajectory s-surface to clear ion path;
(g) After ion packets are ejected from said orthogonal accelerator, pulsed displacing said ion packets in the Y-direction to bring ion packets onto said isochronous mean ion trajectory s-surface; and (h) Isochronously focusing ion packet in the Z-direction towards said detector arranged within or immediately after said step of orthogonal acceleration.

Preferably, the method may further comprise a step of the ion beam spatial confinement at least in said X-direction during the step (a) and wherein said spatial confinement is arranged within electric field of the group: (i) quadrupolar radiofrequency (RF) field; (ii) DC quadrupolar field; (iii) spatially alternated DC field; (iv) spatially alternated DC quadrupolar arranged without oscillation of electrostatic potential on the beam axis; and (v) spatially alternated DC quadrupolar field with spatially gradual rising and for gradual switching off in time, both arranged for spatial and temporal period corresponding to ions passing through at least two alternations of said quadrupolar field.

Preferably, the ratio $L_Z/A_Z$ of said of ion packet length and of said ion advance per single pass (reflection or turn) may be one of the group: (i) $0.5<L_Z/A_Z<1$; (ii) $1<L_Z/A_Z\leq 2$; (iii) $2<L_Z/A_Z<5$; (iv) $5<L_Z/A_Z\leq 10$; (v) $10<L_Z/A_Z\leq 20$; and (vi) $20<L_Z/A_Z\leq 50$.

Preferably, said step of deflecting ion packets in the Y-direction may comprise at least one step of the group: (i) a static or pulsed deflection in electrostatic field of deflector plates; (ii) a static or pulsed deflection in curved field of electrostatic sector; (iii) tilting of said pulsed converter in the XY-plane; and (iv) tilting of an ion mirror in the XY-plane.

Preferably, said step of isochronous ion packet focusing in the Z-direction towards a detector may comprise at least one step of the group: (i) Z-focusing by fields of trans-axial lens and wedges for compensating of at least up to second order time per Z-length aberrations and for compensating spatial focusing of said trans-axial lens and wedge in the Y-direction (ii) deflection by segmented fields of a Freznel lens and wedge arranged with linear gradient of the deflection angle per the Z-coordinate.

Preferably, said step of isochronous ion packet focusing in the Z-direction may be arranged to provide for spatial-temporal correlation of ion beam parameters within said pulsed converter by at least one method of the group: (i) pulsed acceleration of continuous ion beam in the Z-direction either within electrostatic channel or within a radio frequency RF ion guide, located upstream of said orthogonal accelerator; (ii) a time-variable adjustment of ion beam energy within an electrostatic channel or an RF ion guide; (iii) a Z-dependent deceleration of ion beam within said orthogonal accelerator.

Further preferably, said ion beam may be stored and pulsed released in and from a radiofrequency ion guide, synchronized with pulses of said orthogonal accelerator.

Preferably, the timing and the duration of said pulsed ion packet displacement in the Y-direction may be arranged for reducing the mass range of the ion packet; and wherein the period of said pulsed acceleration may be arranged shorter compared to flight time of the heaviest ion species in said MP-TOF fields.

Embodiments of the invention provide a multi-pass MPTOF (multi-reflecting or multi-turn) time-of-flight mass spectrometer comprising:

(a) An ion source, generating an ion beam;

(b) A radio-frequency ion trap converter, substantially elongated in the first Z-direction and ejecting ion packets substantially along the second orthogonal X-direction;

(c) An electrostatic multi-pass (multi-reflecting or multi-turn) time-of-flight mass analyzer (MPTOF), built of ion mirrors or electrostatic sectors, substantially elongated in said Z-direction to form an electrostatic field in an XY-plane orthogonal to said Z-direction; said two-dimensional field provides for a field-free ion drift in the Z-direction towards a detector, and for an isochronous repetitive multi-pass ion motion within an isochronous mean ion trajectory surface—either symmetry s-XY plane of said ion mirrors or curved s-surface of electrostatic sectors;

(d) Wherein said orthogonal accelerator is displaced in the Y-direction from said isochronous mean ion trajectory surface to clear ion path;

(g) Deflectors or sectors, placed immediately after said ion trap converter for pulsed displacing of said ion packets in the Y-direction to bring said ion packets onto said isochronous surface of mean ion trajectory; and (h) Isochronous means for ion packet focusing in said Z-direction towards a detector, arranged either within or immediately after said pulsed converter.

Preferably, said pulsed converter may be tilted to the Z-axis for angle $\alpha/2$ and said means for Z-spatial focusing comprise means for ion ray steering, so that steering of ion trajectories at inclination angle $\alpha$ within said analyzer is arranged isochronously.

BRIEF DESCRIPTION OF THE DRAWINGS

Various embodiments will now be described, by way of example only, and with reference to the accompanying drawings in which.

DETAILED DESCRIPTION

Figure 1:
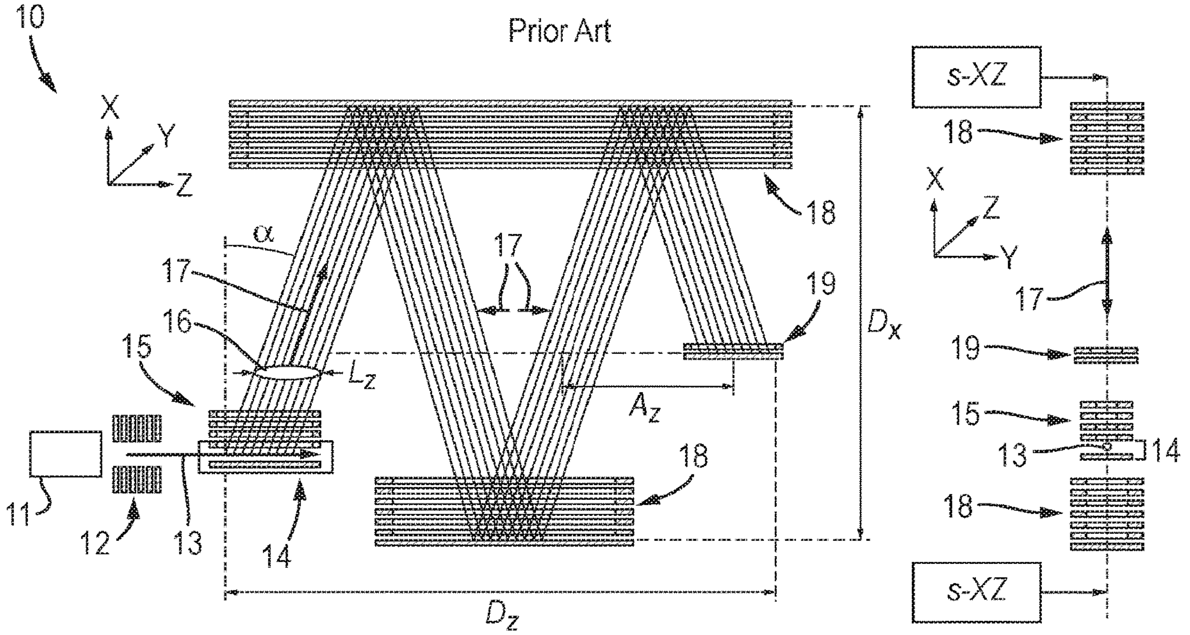
Fig. 1 Prior Art
FIG. 1 shows prior art U.S. Pat. No. 6,717,132 planar multi-reflecting TOF with gridless orthogonal pulsed accelerator OA, illustrating geometrical limits on the OA duty cycle.

Referring to FIG. 1, a prior art multi-reflecting TOF instrument 10 according to U.S. Pat. No. 6,717,132 is shown having an orthogonal accelerator (i.e. an OA-MRTOF instrument). The instrument 10 comprises: an ion source 11 with a lens system 12 to form a substantially parallel ion beam 13; an orthogonal accelerator (OA) 15 with a storage gap 14 to admit the beam 13; a pair of gridless ion mirrors 18, separated by field-free drift region, and a detector 19. Both OA 15 and mirrors 18 are formed with plate electrodes having slit openings, oriented in the Z-direction, thus forming a two dimensional electrostatic field, characterized by symmetry about the XZ-symmetry plane, denoted as s-XZ. All the components (storage gap 14, plates of OA 15, ion mirrors 18 and detector 19) are aligned parallel to the drift axis Z.

In operation, ion source 11 generates ions in a range of specific mass μ=m/z. The exemplary ion source 11 may be a gaseous ion source like ESI, APCI, APPI, gaseous MALDI or ICP. Commonly, ion sources comprise gas-filled radio-frequency (RF) ion guides (not shown) for gaseous dampening of ion beams, followed by a lens 12 to form a substantially parallel continuous ion beam 13. Typical ion beam parameters are: 1 mm diameter, 1 degree angular divergence at specific ion energy (energy per charge) $U_Z$ from 10 to 50V at typical axial energy spread of 1 eV, if using RF ion guides in the source 11.

The beam 13 propagates in the Z-direction through storage gap 14, here a field-free region between plate electrodes. Periodically, an electrical pulse is applied between plates of the storage gap 14. A portion of continuous ion beam 13, occurred in the storage gap 14, is accelerated in the X-direction by a pulsed field of the storage gap 14 and by DC electric fields of the OA 15, and is accelerated to specific energy $U_X$, thus, forming a ribbon shaped ion packets 16, traveling along the mean ion trajectory 17. Since ion packets preserve the z-velocity of the continuous ion beam 13, the trajectories 17 are inclined at an angle α to the X-dimension, typically being several degrees:

$$\alpha=(U_Z/U_X)^{0.5} \quad \text{(eq. 1)}$$

Ion packets 16 are reflected by ion mirrors 18 in the X-direction, continue slow drifting in the Z-direction, and hit the detector 19 after multiple N reflections along a jigsaw ion trajectory 17. To obtain higher resolving power, MRTOF analyzers are designed for longer flight paths and for larger numbers of reflections N>>1 (say, N=10). Then to avoid spectral overlaps on the detector 19 (i.e. confusion between various numbers of reflections), the useful length of ion packets in the Z-dimension $L_Z$ becomes limited to:

$$L_Z<D_Z/N \quad \text{(eq. 2)}$$

$D_Z$ may be the maximum distance in the Z-dimension between which ions are pulsed by OA 15 and detected on detector 19.

For realistic parameters $D_Z$=300 mm and N=10, the ion packet length $L_Z$ is under 30 mm. In practice, the packet length is yet about twice smaller, accounting OA and detector rims. This in turn limits the conversion efficiency of a continuous ion beam 13 into pulsed packets 16, denoted as the duty cycle DC of the orthogonal accelerator 15:

$$DC=\mathrm{sqrt}(\mu/\mu^*)L_Z/D_Z,<\mathrm{sqrt}(\mu/\mu^*)/2N \quad \text{(eq. 3)}$$

Here μ=m/z denotes the specific mass, i.e. mass to charge ratio, and μ* defines the heaviest specific mass in the beam 13. Assuming N=10 and smallest μ/μ*=0.01, the duty cycle for heaviest ions is under 10% and for lightest ions in the beam is under 1%, and realistically under 0.5%. Thus, OA-MRTOF instruments of the prior art have low duty cycle.

The duty cycle limit occurs due to the ion trajectory arrangement within the s-XZ symmetry plane of mirrors 18 and OA 15. It is relevant to embodiments of the present invention that the alignment of ion trajectory within the s-XZ plane is forced to keep the isochronous properties of ion mirrors and of gridless OA, reaching up to third order full isochronicity as described in WO2014142897. The prior art MRTOF 10 has been designed with recognition of the symmetry requirements. The duty cycle is sacrificed in exchange for higher resolving power of OA-MRTOF.

Figure 2:
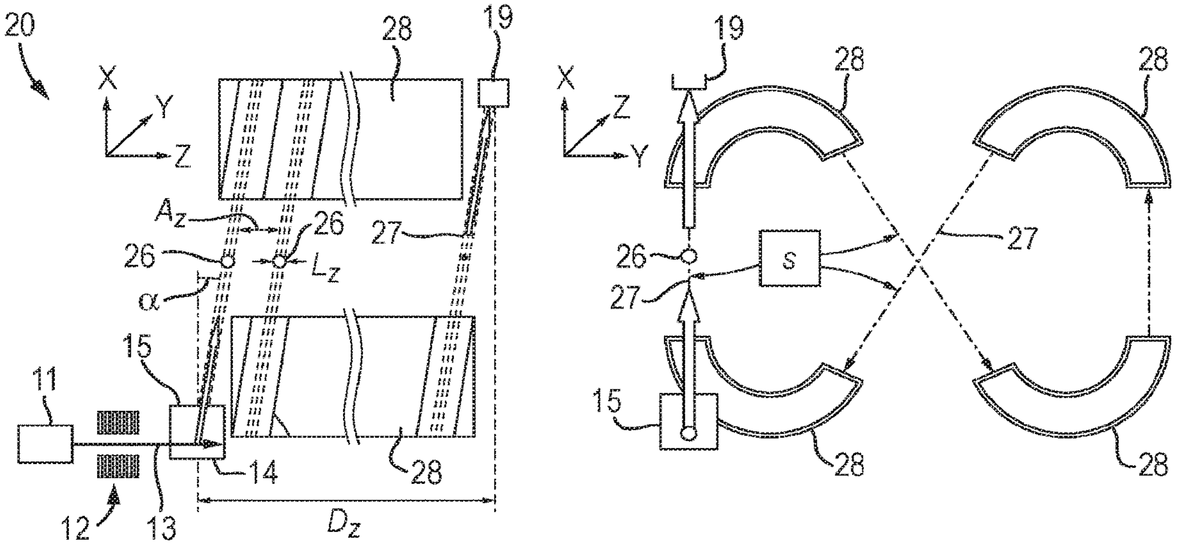
Fig. 2 Prior Art
FIG. 2 shows prior art U.S. Pat. No. 7,504,620 planar multi-turn TOF with OA; both analyzer geometry and laminated sectors limit the ion packet width and the OA duty cycle.

Referring to FIG. 2, a prior art multi-turn TOF analyzer 20 according to U.S. Pat. No. 7,504,620 is shown having an orthogonal accelerator (i.e. an OA-MRTOF instrument). The instrument comprises: an ion source 11 with a lens system 12 to form a substantially parallel ion beam 13; an orthogonal accelerator (OA) 15 with a storage gap 14 to admit the beam 13; four laminated electrostatic sectors 28, separated by a field-free drift region, and a TOF detector 19.

Similarly to embodiment 10, the OA 15 admits a slow (say, 10 eV) ion beam 13 and periodically ejects ion packets 26 along the ion trajectory 27. Electrostatic sectors 28 are arranged isochronous for a spiral ion trajectory 27 with figure-of-eight shaped ion trajectory in the XY-plane and with a slow advancing in the drift Z-direction corresponding to a fixed inclination angle α. The energy of ion beam 13 and the OA acceleration voltage are arranged to match the inclination angle α of laminated sectors.

The laminated sectors 28 provide three dimensional electrostatic fields for ion packet confinement in the drift Z-direction along the mean spiral trajectory 27. The field of four electrostatic sectors 28 also provide for isochronous ion oscillation along the figure-of-eight shaped central curved ion trajectory 27 in the XY-plane, also denoted as s. The prior art sector analyzers are known to provide for so-called triple focusing, i.e. first-order focusing with respect to energy spread around a mean ion energy and with respect to angular and spatial spread of ion packets around the mean ion trajectory. The sector MTTOF isochronicity has been recently improved with electrostatic sectors of non equal radii, as described in WO2017042665.

The ion trajectory in MTTOF 20 is locked to fixed spiral trajectory 27 (*s*), which forces the sequential arrangement of OA 15, sectors 28 and of the detector 19, thus limiting the duty cycle of the OA to under 1/N, where N is the number of full turns. In addition, to arrange the spatial ion confinement within laminated sectors 28 in the Z-direction, the length $L_Z$ of ion packets 26 shall be at least twice smaller than the z-width of the laminated channel, and hence, the duty cycle of MTTOF 20 is limited by eq. 3 above. Embodiments of the present invention propose a method and apparatus for improving the duty cycle of orthogonal accelerators (OA) for multi-pass MPTOF—both multi reflecting OA-MRTOF and multi turn OA-MTTOF.

Figure 3:
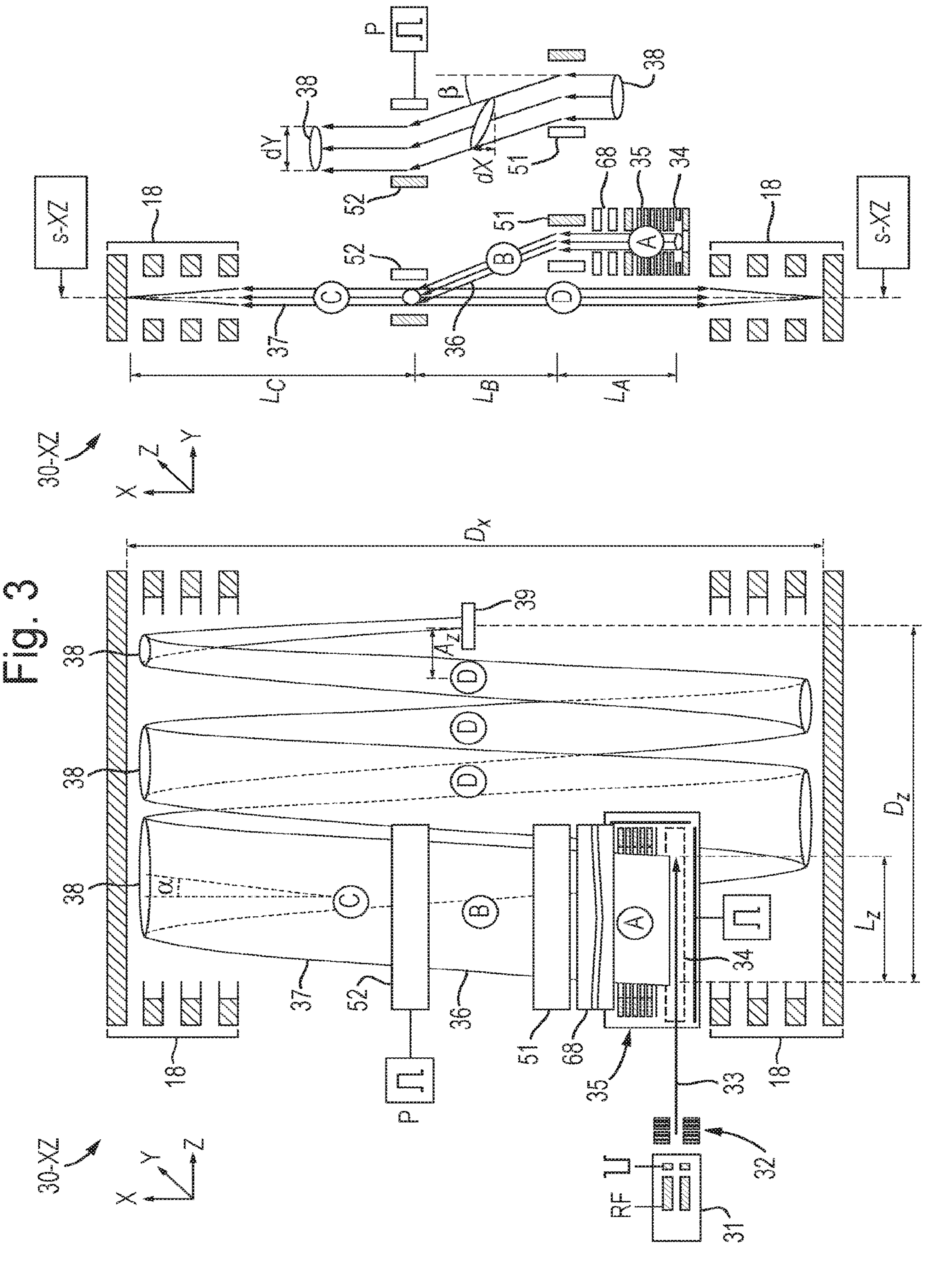
FIG. 3 shows an OA-MRTOF embodiment of the present invention, improving the duty cycle of an orthogonal pulsed converter by steps of OA elongation, ion beam confinement within the OA, bypassing the OA by side packet deflection, and by spatial focusing of ion packets towards a TOF detector.

FIG. 3 shows an OA-MRTOF embodiment 30 of the present invention comprising: a continuous ion source 31; a lens system 32 to form a continuous and substantially parallel ion beam 33; an orthogonal accelerator 35, preferably having means for ion beam spatial confinement 34 (detailed in FIG. 11 and FIG. 12); an isochronous Z-focusing lens, exampled here by trans-axial lens 68 (detailed in FIG. 7); a set of dual Y-deflectors 51 and 52 (detailed in FIG. 5); a pair of parallel gridless ion mirrors 18, separated by a floated field-free drift space; and a TOF detector 39. Electrodes of OA 35 and of ion mirrors 18 are substantially elongated in the drift Z-direction to provide a two-dimensional electrostatic field in the X-Y plane, symmetric around the s-XZ symmetry plane of isochronous trajectory surface and having zero field component in the Z-direction. Preferably, ion source 31 comprises an RF ion guide with pulsed exit gate, denoted by RF and by pulse symbol.

In operation, a continuous or quasi-continuous ion source 31 generates ions. A substantially parallel ion beam 33 is formed by ion optics 32, enters OA 35 substantially along the Z-direction and, preferably, is spatially confined in at least the X-direction with confinement means 34 within the z-elongated storage gap of OA 35. An $L_Z$ long portion of continuous beam 34 is converted into pulsed ion packets 38 by an orthogonal pulsed acceleration field of OA 35. Ejected ion packets 38 move at an inclination angle α to the X-dimension, controlled by the $U_Z$ specific energy of the incoming ion beam 13 and acceleration voltage $U_X$ of the drift space (see eq. 1). Ion packets are reflected between ion mirrors 18 in the X-direction within the s-XZ symmetry plane for a large number of reflections (say N=10) and while drifting towards the detector 19 because they retain the $K_Z$ component of ion energy.

Similar to the prior art arrangement in FIG. 1, the embodiment 30 employs the two-dimensional Z-extended MR-TOF and the OA oriented in the Z-direction. Distinctly from the prior art of FIG. 1, the duty cycle of MRTOF 30 is improved by the combination of the following novel steps:

(A) Z-elongation of OA 35: To improve the duty cycle of OA 35, the length $L_Z$ of the OA 35 and of ion packets 38 ejected from OA is made longer than half of the ion packet advance distance $A_Z$ per single mirror reflection, i.e. $2L_Z>A_Z=D_Z/N$. Ultimately, $L_Z$ length may be comparable to notable portion (say, ½) of the total drift length $D_Z$, even if using large number of mirror reflections (say, N=10). Preferably, the ratio $L_Z/A_Z$ may be one of the group: (i) $0.5<L_Z/A_Z\leq 1$; (ii) $1<L_Z/A_Z\leq 2$; (iii) $2<L_Z/A_Z\leq 5$; (iv) $5<L_Z/A_Z\leq 10$; (v) $10<L_Z/A_Z\leq 20$; and (vi) $20<L_Z/A_Z\leq 50$.

(B) Pulsed Y-displacement of ion packets: To avoid the ion packet interfering/impacting with the OA, the OA 35 is Y-displaced from the s-XZ symmetry plane of ion mirrors 18 so that path D bypasses the Y-displaced OA 35. Ion packets are pulsed displaced from the original ion path A (past the axis of OA) to the tilted path B, then deflected to path C and then reflected to path D of ion trajectory 37, wherein paths C and D are aligned within the s-XZ symmetry plane of ion mirrors 18 to provide for isochronous ion motion. If operating within isochronous symmetry plane, ion mirrors are known to provide for up to third-order full isochronicity and up to fifth-order time per energy focusing, as described in prior art WO2013063587 and WO2014142897, incorporated herein by reference. The exemplary side Y-deflection of ion packets 36 is arranged with static deflector 51 and with pulsed deflector 52. The dual deflection is arranged to eliminate first-order time front steering dX=0 of ion packets 36, as detailed in FIG. 5 below.

(C) Isochronous Z-focusing of ion packets: To avoid ion losses on the detector 19, and so as to avoid spectral overlaps and spectral confusion (contrary to prior art open traps, described in WO2011107836), the ion packets 38 are spatially focused in the Z-direction by a trans-axial lens 68 in FIG. 6, or by Fresnel lens 75 in FIG. 7, or by spatial space-velocity correlation within the OA, as described in FIG. 10. It is of importance that the Z-focusing is arranged isochronous, i.e. with compensation of T|Z and T|ZZ time aberrations per Z-width of ion packets, which otherwise would occur if using a conventional Einzel lens. Preferably, spatial Z-focusing may be further complemented by measures, reducing ion packet angular divergence, as described in FIG. 8 and FIG. 9.

(D) Spatial ion beam confinement in the OA: Preferably, means 34 are arranged for spatial ion beam confinement to prevent the natural expansion of ion beam 13 within the OA 35 and to allow substantial (potentially indefinite) elongation of the OA without ionic losses and without the ion beam spread, as detailed below in FIG. 11 and FIG. 12.

A numerical example will now be presented for embodiment 30, where the main parameters are shown in Table 1 below.

TABLE 1

| $D_X$ mm | $D_Z$ mm | $U_X$ V | $U_Z$ V | α mrad | $A_Z$ mm | N refl | L m | $L_Z$ mm | DC % |
|---|---|---|---|---|---|---|---|---|---|
| 1000 | 300 | 10000 | 10 | 30 | 30 | 10 | 10 | 150 | 50 |

Let us chose MRTOF ion mirrors with $D_X$=1 m (i.e. the distance between the end cap electrodes of the opposing mirrors) and $D_Z$=300 mm (i.e. the mirror useful Z-width, not affected by 3D fringing fields at Z-edges). Let us choose the acceleration voltage of the MRTOF as $U_X$=10 kV. The ion beam specific energy may be set to $U_Z$=10V, the average inclination angle α set to α~30 mrad by eq. 1, i.e. the ion packet advance $A_Z$ per ion mirror reflection is $A_Z$=30 mm, and the number of ion mirror reflections set to $N=D_Z/A_Z=10$ (total flight path $L=D_X*N=10$ m). If using a conventional OA-MRTOF 10, and accounting for rims of the OA and detector, the ion packet length $L_Z$ would be limited to under $D_Z/2N=15$ mm and the duty cycle for the heaviest p mass component would be limited to under DC=1/2N=5%, as defined by equation (3). With the proposed improvements of embodiment 30, the OA length can be increased, say, to $L_Z$=150 mm, thus improving the OA duty cycle for the heaviest mass component p to DC=50%, i.e. by the order of magnitude.

Accounting for eq. 3, the duty cycle DC of any OA drops for lighter (smaller μ=m/z) ions. As an example, reaching DC=50% for upper mass (say μ=2500), still limits the duty cycle to DC=10% for μ=100 ions. The duty cycle for lighter ions can be further improved if using the RF ion guide of ion source 31 in so-called "Pulsar" mode, where ions are stored within the RF ion guide and are pulsed released synchronized with OA pulses by an exit gate, as indicated by pulse symbol connected to the exit aperture of the RF ion guide. The propagation time of light ions within the OA (estimated as 50 us for μ=100 at $K_Z$=10 eV and $L_Z$=150 mm) appears larger than the time delay for extraction of heavy ions from the "Pulsar" RF ion guide, which is known to be about 20-30 us for μ=1000 ions. Thus, using a long OA 35 allows the analysis of a wide mass range at enhanced sensitivity.

Contrary to the prior art, using a long OA substantially extends the mass range M/m of the "Pulsar" method to match M/m, simultaneously transmitted in RF ion guides, i.e. the Pulsar method no longer limits the mass range. Contrary to prior art Pulsar OA-TOF, "Pulsar" gain is substantially higher for OA-MRTOF at substantially longer flight times and flight paths (say, tens and hundreds of meters). Indeed, ions are stored in the RF ion guide between rare OA pulses, while ejected packets are admitted into OA with nearly unity duty cycle and at wide mass range.

In target analyses, samples are separated with a gas or liquid chromatography device, and at any particular retention time RT, only one or few target mass species are analyzed. Both duty cycle and dynamic range of target analyses can be readily improved in OA-MRTOF 30 if: (a) selecting narrower m/z range at short pulse durations of the deflector 52, and (b) more frequent pulsing of the OA 35 (compared to normal operation, where pulse period matches TOF flight time of heavier ion species). Since a narrower mass range is selected (say, one tenth of full mass range), faster pulsing does not cause spectral overlaps. Faster pulsing at periods being shorter than ion propagation time in the OA improves the DC of the OA. Faster pulsing improves the upper end of the dynamic range by spreading analyzed ions between larger number of pulses, thus, reducing space charge limits in the analyzer and reducing the detector load per pulse. Mass selection reduces the detector load by eliminating unwanted mass species on the detector. Note that the target method does not require use of an upfront mass separator like a quadrupole mass filter. The method may be further improved with the "Pulsar" method for yet higher duty cycle (expected to gain at smaller p range).

Figure 4:
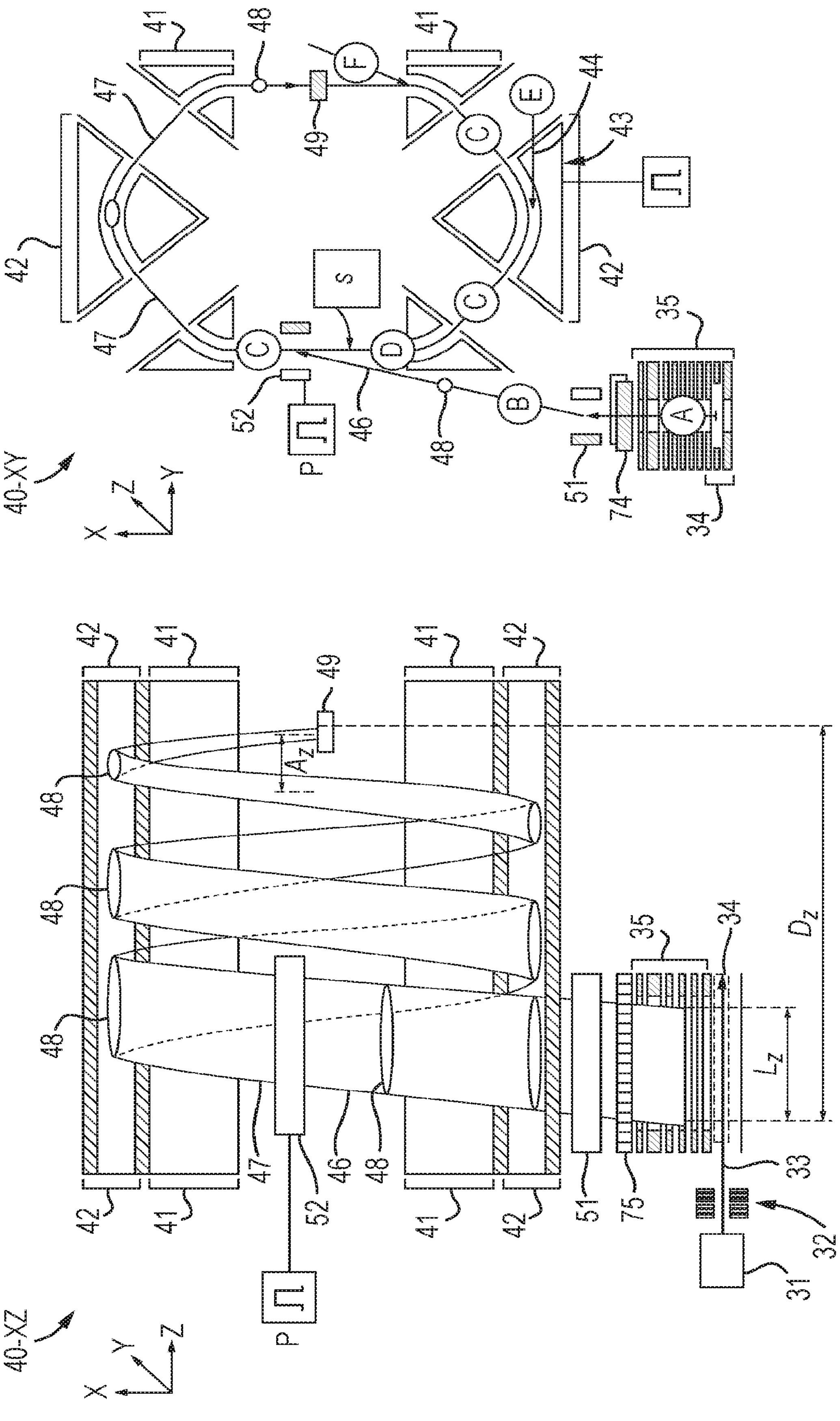
FIG. 4 shows an OA-MTTOF embodiment of the present invention, improving the duty cycle of an orthogonal pulsed converter, similarly to FIG. 3.

Embodiments of the invention provide similar OA improvements for multi-turn TOF as well. Referring to FIG. 4, the OA-MTTOF embodiment 40 of the present invention comprises: a continuous ion source 31 (optionally with an RF ion guide in a pulsar mode); a lens system 32 to form a substantially parallel ion beam 33; a Z-elongated gridless orthogonal accelerator 35 with optional means 34 for spatial ion confinement; an isochronous Z-focusing lens, exampled here by Fresnel lens 75 (detailed in FIG. 7); a set of dual Y-deflector 51 and 52; a set of electrostatic sectors 41 and 42, separated by drift spaces; and a TOF detector 49. Sectors 41 and 42 are substantially extended in the drift Z-direction, and the beam 33 is oriented along the Z-direction. Contrary to the prior art of FIG. 2, the sectors are made without laminations to provide two-dimensional field in the XY-plane without a Z-component.

In operation, orthogonal accelerator 35 accepts the ion beam 13 within a Z-elongated storage gap, wherein means 34 serves to confine the ion beam at least in the X-direction, as detailed in FIG. 11 and FIG. 12 below. OA 35 accelerates a portion of ion beam by pulsed field and then by DC electrostatic field in the X-direction, thus forming ion packets 48. Ion packets 48 move at a mean inclination angle α to the X-dimension, controlled by the specific energy of the ion beam 13, along the portion A of trajectory 46. Fresnel lens 75 (or some other Z-focusing means described herein, e.g. below) is arranged for spatial focusing of ion packets 48 in the Z-direction towards the detector 19. The set of dual Y-deflectors 51 and 52 is arranged for displacing of ion packet 48 from the axis of gridless OA 35 to curved surface S of isochronous mean ion trajectory 47. Ion packets follow portions A, B of trajectory 46 and then trajectory C, also denoted as 47. As the z-energy of the continuous ion beam 13 is preserved, ion packets 48 follow a spiral ion trajectory 47 within the mean trajectory surface S to provide for at least first order full isochronicity.

Preferably, sectors 41 and 42 have different radii, e.g. as described in WO2017042665, to provide for higher order isochronicity. Contrary to the prior art 20 in FIG. 2, sectors 41 and 42 of MTTOF 40 do not have any electrostatic field component in the Z-direction, thus neither affecting nor enforcing the spiral motion 47.

The stadium shaped ion trajectory s-surface is arranged between electrostatic sectors 41 and 42, separated by floated field-free regions. The sectors XY-field and ion packet energy in the X-direction are adjusted for isochronous ion packet motion within the trajectory surface S. The inclination angle α is controlled by the ion beam 13 energy and by Fresnel lens Z-focusing only. The drift length $D_Z$ and the injection inclination angle α are chosen to allow for multiple (say N=10) full ion turns, before ions hit the detector 49.

To improve the duty cycle of OA 35, the length $L_Z$ of the OA 35 and of ion packets 48 is made comparable (say ½) to the total drift length $D_Z$. At large numbers of ion turns (say N=10) the ion packet length $L_Z$ appears much longer than the ion packet advance $A_Z$ per single turn.

Figure 5:
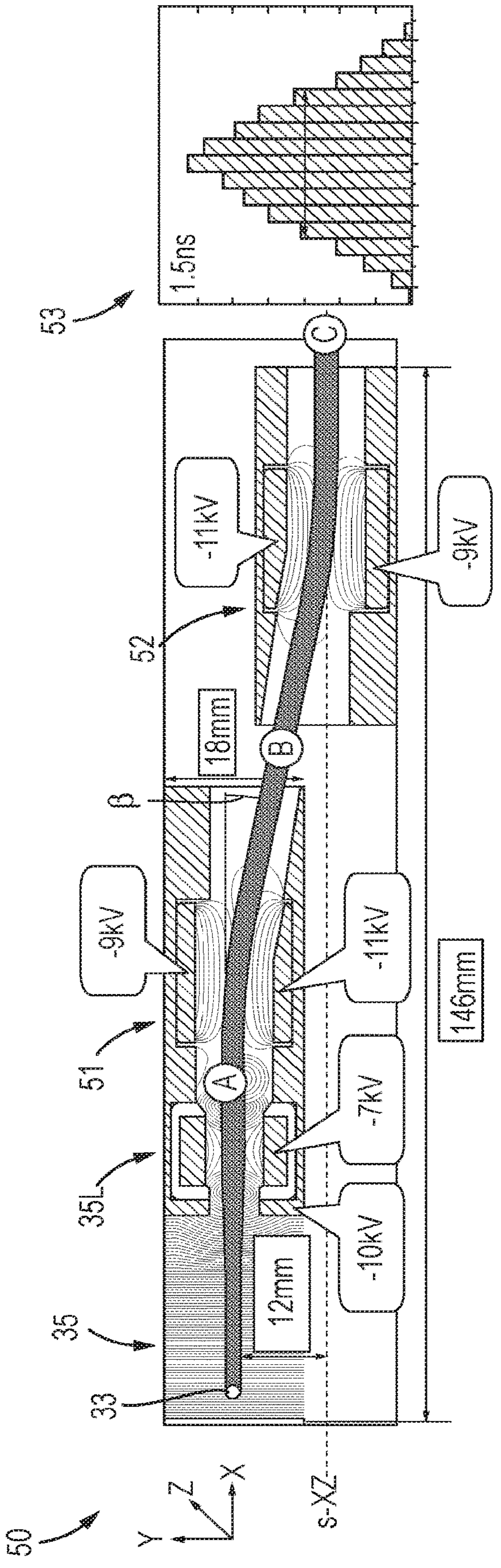
FIG. 5 shows results of ion optical simulations of a double deflector embodiment, providing ion packet Y-displacement at minor effects on OA-MPTOF isochronicity.

Similar to FIG. 3, embodiment 40 employs similar ion optical methods and embodiments for: pulsed ion packet Y-displacement, described in FIG. 5; Z-focusing of ion packets, described in FIG. 6, FIG. 8 and FIG. 10; reducing the ion packets angular divergence, described in FIG. 8 and FIG. 10; so as methods of ion beam confinement in the OA, described in FIG. 11 and FIG. 12. Those embodiments are detailed below.

Referring to FIG. 5, one embodiment 50 of Y-displacement means comprises a static (or pulsed) deflector 51 and a pulsed deflector 52. OA 35 is aligned parallel and is displaced from the symmetry plane s-XZ of ion mirrors 18 as in FIG. 3 (or from S-surface in FIG. 4) to allow ion packets 38 bypassing the OA on the way back along the trajectory D, lying within the s-XZ plane. Deflector 51 is aligned with OA 35, and deflector 52 is aligned with the s-XZ plane. Deflectors 51 and 52 steer ion packets at the same angle β(in the X-Y plane).

FIG. 5 presents results of ion optical simulations and shows equipotential lines and ion trajectories for an exemplary OA 35, being 18 mm wide in the Y-direction and 25 mm long in the X-direction. The axis of OA 35 is Y-displaced by 12 mm from the s-XZ middle plane. The pulsed and static acceleration part of the OA 35 is modeled here with an ideal uniform field of $E_X$=400V/mm strength, accelerating ion packets to −10 kV voltage of the floated drift space. For exemplary ion beam 33 of 2 mm diameter and 2 degree divergence at $K_Z$=10 eV axial energy, the turn-around time of m/z=1000 amu ions is $T_{TA}$=1 ns. The static deflector 51 is arranged with two plates at −9 and −11 kV, steering ion packets by 10 degrees. The second deflector 52 is composed of two plates, which are pulsed from −10 kV drift voltage to −9 kV and −11 kV respectively. After dual deflection the ion packets get displaced by 12 mm in the Y-direction and then travel at zero mean angle and within the s-XZ symmetry plane.

A single step of ion trajectory steering by deflector 51 by angle β steers the time front of ion packets 38 by the same angle β and increases the ion packet X-spread by dX=dY*β=0.3 mm for exemplary dY=2 mm and β=0.15 rad, where dY is the ion packet width in the Y-direction. The double steering of FIG. 5 compensates to the first order for tilting of the time front. Inevitable spatial Y-focusing of deflectors 51 and 52 is compensated by an additional lens 35L, built into the OA 35. Retarding lens 35L, set at 7 kV potential, also serves for terminating the acceleration field.

Graph 53 presents the simulated overall time spread of 1000 amu ions past deflector 52. The full width at half maximum FWHM=1.5 ns, including Ins turn around time. For the exemplary MRTOF of Table 1 having a 10 m flight path and 230 us flight time for 1000 amu ions at 10 kV acceleration, the scheme is expected to allow a resolution of R=80,000 at conservatively and pessimistically chosen parameters of the continuous ion beam 33 (i.e. 2 mm×2 deg).

Referring back to FIG. 3, the described method of pulsed ion displacement may limit the transmitted mass range. The lighter ions of mass m are able to complete two paths C (i.e. reaching the pulsed deflector 52 after a single mirror reflection), while the heavy ions of mass M are completing path B and reaching the pulsed deflector 52 from the other direction. The transmitted mass ratio M/m is then defined as the square of path ratio:

$$M/m=[(2L_A+L_B+2L_C)/(2L_A+L_B)]^2 \quad \text{(eq. 4)}$$

In the presented example, $2L_A+L_B$=170 mm, accounting twice slower motion in 25 mm long accelerating field, $2L_C=D_X$=1000 mm, and hence, M/m>45, which exceeds the typical M/m limit of RF ion guides (between 10 and 30). Thus, the pulsed deflection scheme does not pose any significant mass range limitations at cap-cap distance $D_X$=1 m and is acceptable (M/m>10) at yet smaller analyzer sizes, e.g. down to $D_X$=0.5 m.

The scheme of Y-deflection may be further improved if using a slimmer (in Y-direction) OA 35 for reducing the deflection angle β and or for minimizing the length of ion path $L_B$ for higher mass range M/m in smaller $D_X$ analyzers. Preferably, OA 35 comprises thin and densely spaced electrode slits, preferably attached between printed circuit boards (either epoxy or ceramic PCB).

It is understood that the exemplary deflector plates may be replaced with a pair of deflecting sectors or by an S-shaped sector. Sectors 41 and 42 may be arranged pulsed and optionally having side ports 44 for ion packet injection along alternative paths, exampled by paths F and E in FIG. 4.

Figure 6:
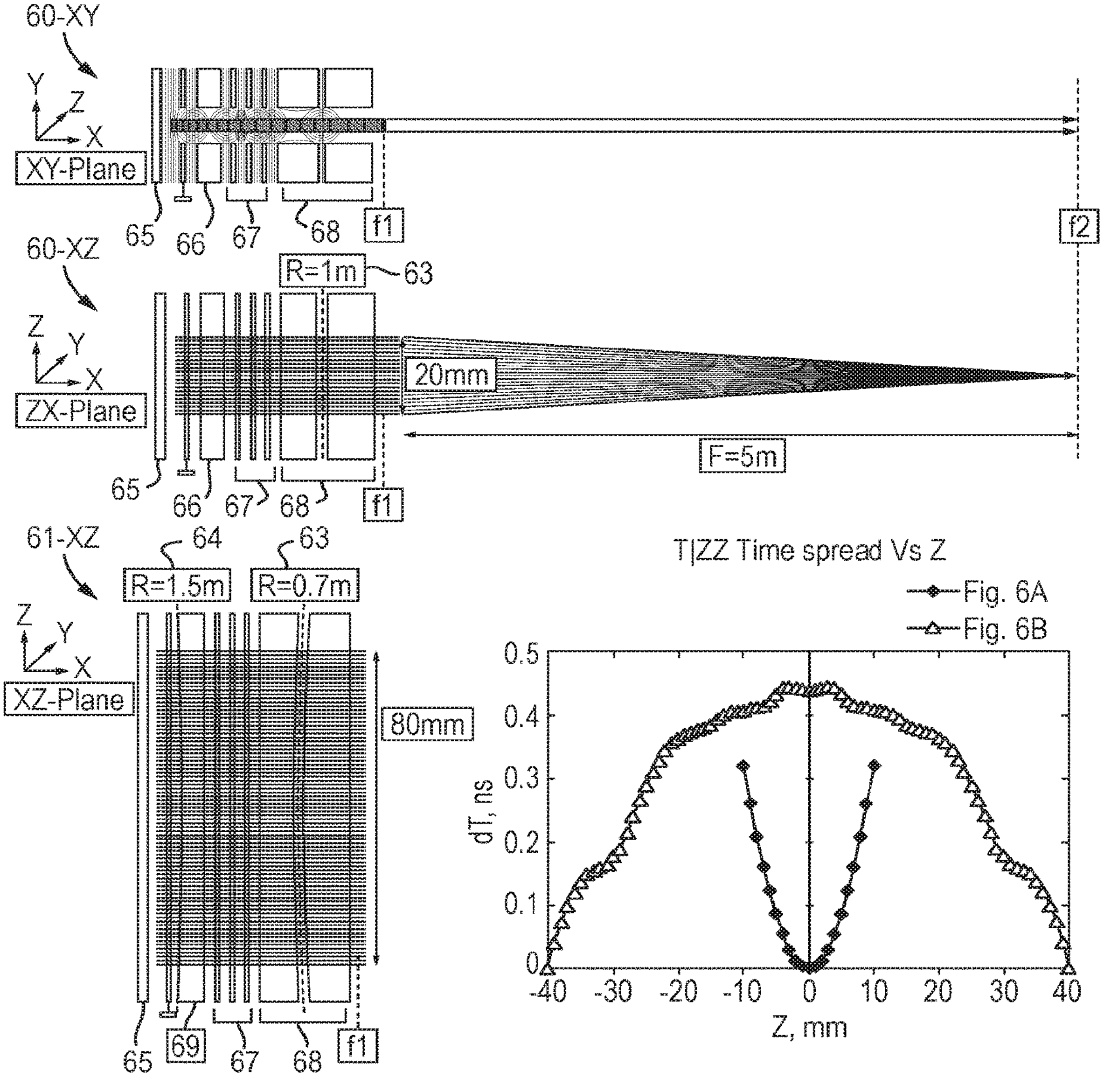
FIG. 6 illustrates ion optical simulations of ion packet Z-focusing by isochronous trans-axial (TA) lens, compensated by TA pull electrode, suitable for isochronous focusing of long (up to 200 mm) ion packets.

Trans-axial lens for isochronous Z-focusing: Referring to FIG. 6, there are shown two embodiments 60 and 61 of a gridless orthogonal accelerators having a trans-axial lens. Both embodiments comprise push plate 65, grounded slit electrode, pull slit electrode 66, slit electrodes 67 for DC acceleration, and a trans-axial lens 68—a slit electrode split into two electrodes by a constant width gap being curved in the X-Z plane, e.g. at curvature radius R~1 m. The trans-axial lens 68 is chosen for being slim in the Y-direction, which is important for ion packet Y-displacement, shown in FIG. 5. Embodiment 61 differs from embodiment 60 by using trans-axial curved pull electrode 69.

FIG. 6 presents ion optical simulations with iso-potential lines and ion trajectories shown for the XY and XZ-planes. Curvatures 63 and 64 of the TA lens and TA pull electrode respectively show radius R values, used for exemplary simulations. As confirmed in simulations, the trans-axial lens 68 serves at least three purposes: (a) terminating the electrostatic DC accelerating field of gridless slit electrodes 67; (b) providing for ion spatial focusing in the XZ-plane to focal plane f2, in all cases simulated for F=5 m focal distance; and (c) providing a substantially parallel beam in the XY-plane.

Referring to FIG. 6, the graph shows the time spreads introduced by the spatial ion Z-focusing, simulated for 1000 amu ions. The trans-axial lens 68 alone in the embodiment 60 introduces a positive T|ZZ aberration with additional time spread dT(z)=T|ZZ*z. The long focal distance F=5 m helps keep the aberration moderate and allows focusing $L_Z$=20 mm long ion packets at dT(z)=0.3 ns amplitude. Assuming a Ins limit, the embodiment is suitable for focusing of $L_Z$=35 mm long ion packets at F=5 m focal distances and $L_Z$=50 mm long ion packets at F=10 m focal distances, which is yet too short to obtain the full advantage of the novel orthogonal accelerator.

The use of curved pull electrode 69 in embodiment 61 allows reverting the sign of the overall T|ZZ aberration, i.e. the pull curvature radius or the focal distance of the trans-axial lens can be optimized for complete mutual compensation of T|ZZ aberrations. Even at current imperfectly balanced compensation, embodiment 61 is already suitable for $L_Z$=160 mm long ion packets at longer F=10 m focal distances, i.e. provides for isochronous Z-focusing of long $L_Z$=150 mm ions packets for the numerical example of Table 1 with flight path L=10 m.

Figure 7:
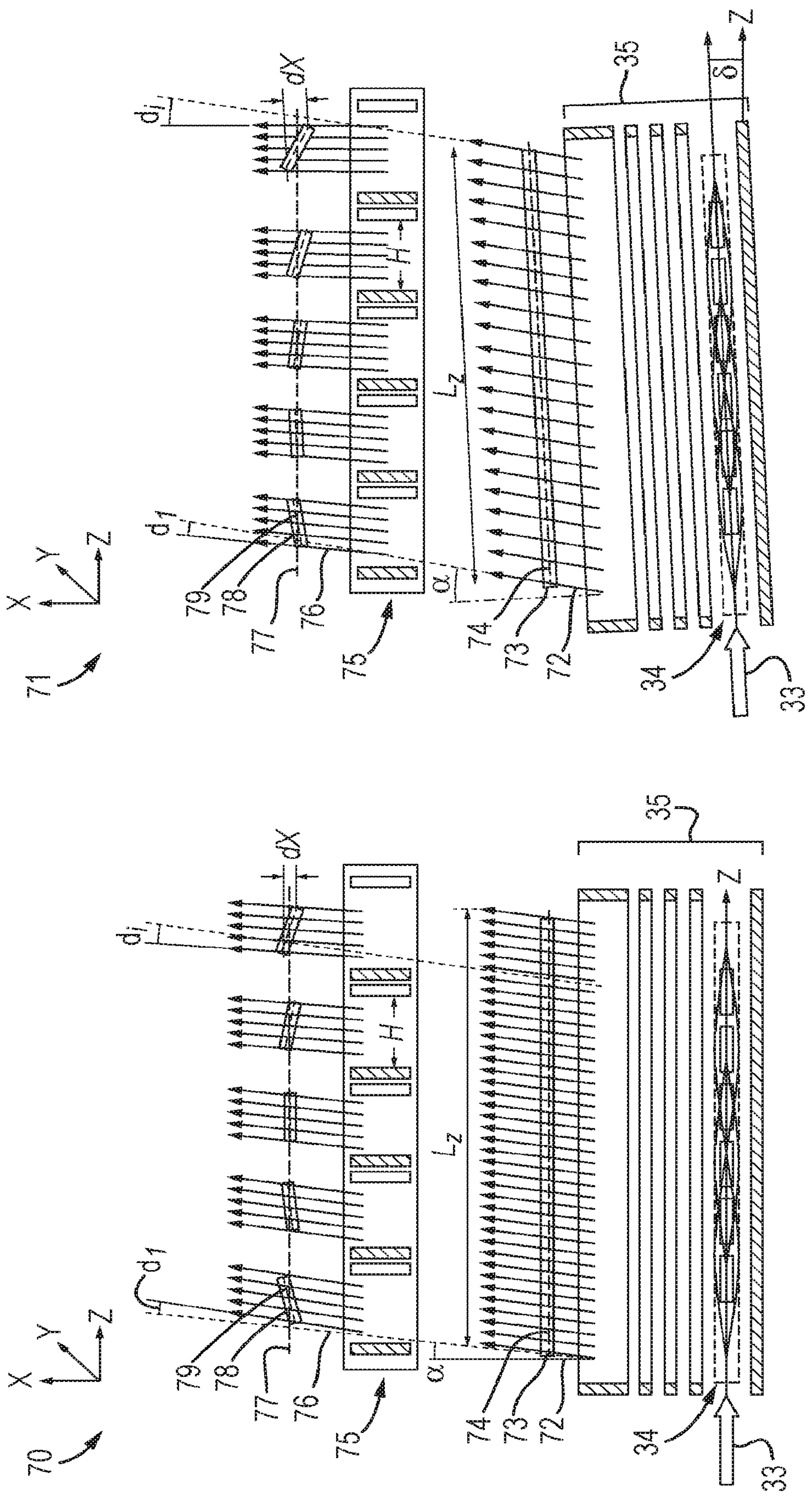
FIG. 7 illustrates ion packet Z-focusing and Z-deflection by Freznel lens/wedge, estimated to produce minor time spreads of ion packet segments.

Fresnel lens for Z-focusing: Referring to FIG. 7, another embodiment 70 of isochronous Z-focusing means comprises an electrostatic Fresnel lens 75, set up downstream of an orthogonal accelerator 35. Fresnel lens 75 is arranged with multiple segments of deflectors, where the angle of ion steering d; is linearly dependent on the segment number i. Obviously, linear dependence of the deflection potential may be arranged by a resistive divider. Preferably, the voltage bias (relative to floated drift potential of the field free region) on Fresnel electrodes is adjusted so that back-to-back electrodes have exactly opposite bias to minimize long term fields.

In operation, ion packet 73 downstream of OA 35 travels along path 72 at natural inclination angle α, defined by equation (1) as a ratio of axial and transverse specific energies $\alpha=\mathrm{sqrt}(U_Z/U_X)$. The time front of ion packet 74 is parallel to the axis Z, as illustrated by dashed line. The Fresnel lens 75 splits ion packet 73 into multiple segments 78 and steers them to follow trajectories 76, with deflection angle d; (to the X-axis) being dependent on the segment number i. The desired deflection angle can be found as dZ/L, where dZ is the Z-distance from the packet center and L is the flight path in the TOF analyzer 30 or 40. Thus, maximal deflection angle is $d_\alpha \le L_Z/2L$. Individual deflector segments are known to steer the time front 79 at the angle being equal to the steering angle $d_i$. The time front distortion in the i-section can be then estimated as $dX_Z=H*d_i$, where H is the pitch of Fresnel lens. Then the resolution limit of MPTOF (30 or 40), set by Fresnel lens is:

$$R_Z=L/2dX_Z=L^2/L_ZH \quad \text{(eq. 5)}$$

Setting the pitch to H=1 mm at $L_Z$=200 mm brings the resolution limit to $R_Z$=500,000 for MPTOF with L=10 m. Note that arranging similar Z-focusing by standard means, e.g., by Einzel lens, would ruin the MPTOF resolution to $R_Z<2L^2/L_Z^2<5{,}000$ at $L_Z$=200 mm and L=10 m.

Referring back to FIG. 7, embodiment 71 illustrates the example of tilting OA 35 at angle δ relative to the Z-axis. The deflection angles $d_i$ of individual segments of the Fresnel lens 75 are adjusted to provide both back deflection of all ion packets 78 at angle Sand the Fresnel focusing of embodiment 70. Tilting of the OA and steering of the ion packets at the same angle 1 aligns the average time front 77 parallel to the Z-axis. The next section describes the reason for tilting and steering.

Figure 8:
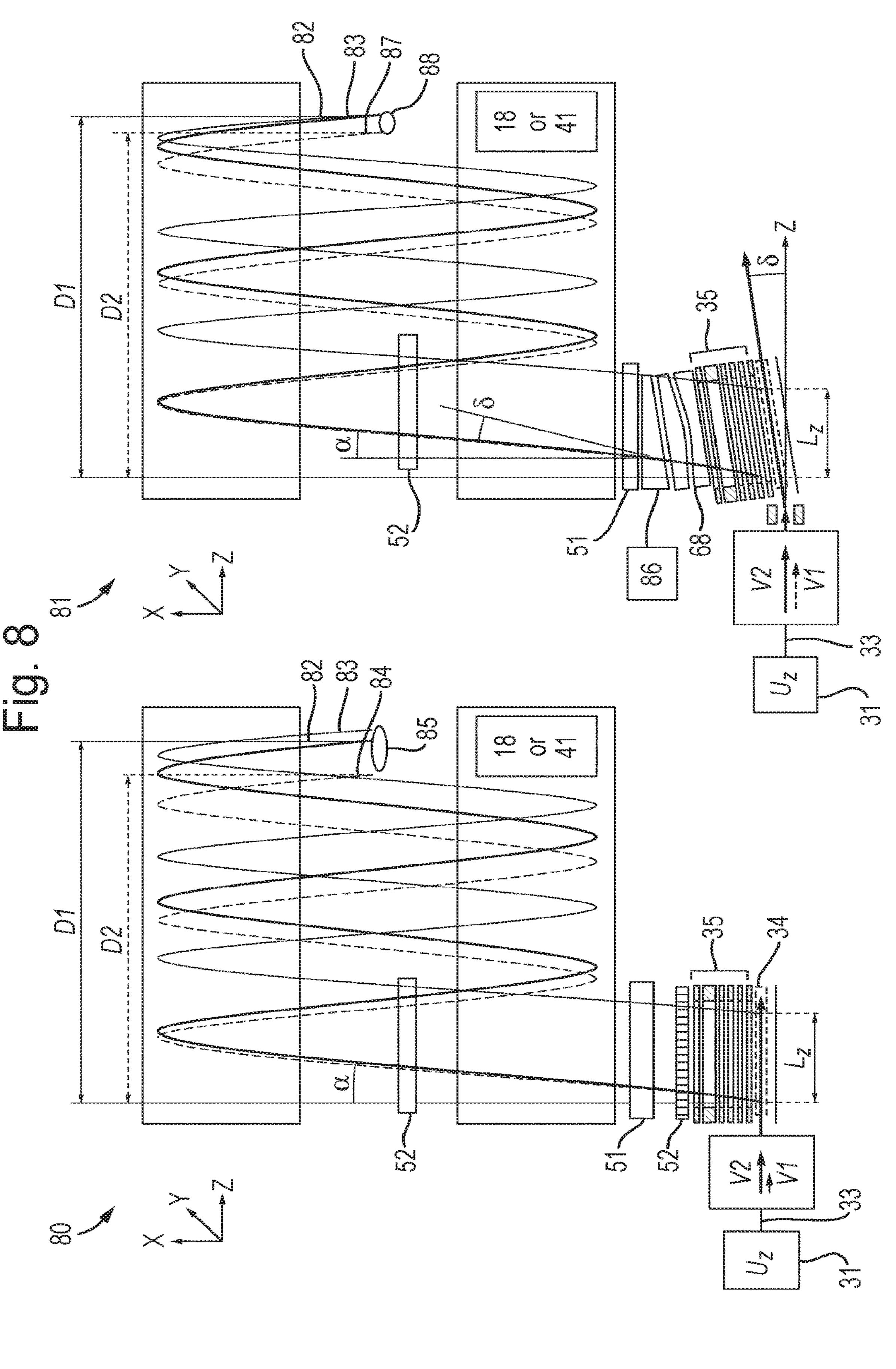
FIG. 8 illustrates the effect of axial energy spread $dK_Z$ on ion packet divergence D2-D1 and illustrates a method of OA tilt for reducing the packet divergence at higher axial energies $K_Z$.

Improving Z-focusing of ion packets: Referring to FIG. 8, embodiments 80 and 81 illustrate the improvement of ion packet spatial focusing in the Z-direction at elevated specific axial energies $U_Z$ of continuous ion beam 33. Both embodiments 80 and 81 comprise an orthogonal accelerator OA 35 and a multi-pass MPTOF, which may be using either ion mirrors 18 of FIG. 3 or sectors 41 and 42 of FIG. 4. Both embodiments employ Z-elongated OA 35, displaced from the s-XZ symmetry plane of FIG. 3 or from s-surface of FIG. 4, double Y-deflectors 51 and 52 for returning ion packets onto the s-XZ plane or s-surface, and Z-focusing means, either Fresnel lens 75 or trans-axial lens 68.

Embodiment 80 illustrates the problem of ion packets natural expansion due to axial velocity spread V2−V1 of continuous ion beam 33, as presented by solid 82 and dashed 84 ion trajectories. Ions originating from the same Z-point in the OA will spread between D2 and D1 displacements when reaching the detector. Since spatial focusing of Z-lens 75 or 68 depends on the ion initial Z-position, the Z-lens does not compensate for the V2−V1 spread. The relative spatial spread on the detector equals to relative axial velocity spread:

$$(D2-D1)/D1=(V2-V1)/V=dK_Z/2K_Z=dU_Z/2U_Z \qquad \text{(eq. 6)}$$

Accounting for the fixed spread of specific energy $dU_Z$ past typical ion sources (say, $dU_Z$=1V past RF ion guides), it is advantageous to accelerate continuous ion beams to higher specific energies $U_Z$. Using higher axial energies $U_Z$ in the embodiment 80 would increase inclination angle α (see eq.)), reduce the number of ion mirror reflections N, and would sacrifice the MPTOF resolution.

To increase axial specific energy $U_Z$, while retaining lower inclination angle α (for larger number N of ion reflections in MRTOF or MTTOF), the embodiment 81 differs from 80 by tilting of OA 35 at angle δ to the Z-axis and by arranging back deflector of ion packets at the same angle δ, either within Fresnel wedge/lens in embodiment 71 or with a trans-axial wedge 86. Note that the effect of a fixed trans-axial (TA) wedge can be achieved by tilting the trans-axial (TA) lens 68. However, it is expected that separating functions between TA-lens and TA-wedge may be preferable for flexible and independent control of ion beam energy and of spatial Z-focusing.

MPTOF with higher acceleration: Using higher acceleration voltages $U_X$ in MRTOF or MTTOF is another alternative to OA tilt. For stability against electrical breakdown it is preferable to use absolute voltages near or under 15 kV. The strategy is readily available for the sector multi-turn MTTOF 40 of FIG. 4, since potentials of sectors 41 and 42 are only a few kV higher than the drift voltage. Thus, $U_X$ may be brought to 15 kV, this way bringing $U_Z$ to 15V at α=30 mrad, defined by equation eq. 1, while reducing packet divergence D2−D1 to 10 mm at $D_Z$=300 mm, as defined by eq. 6.

Figure 9:
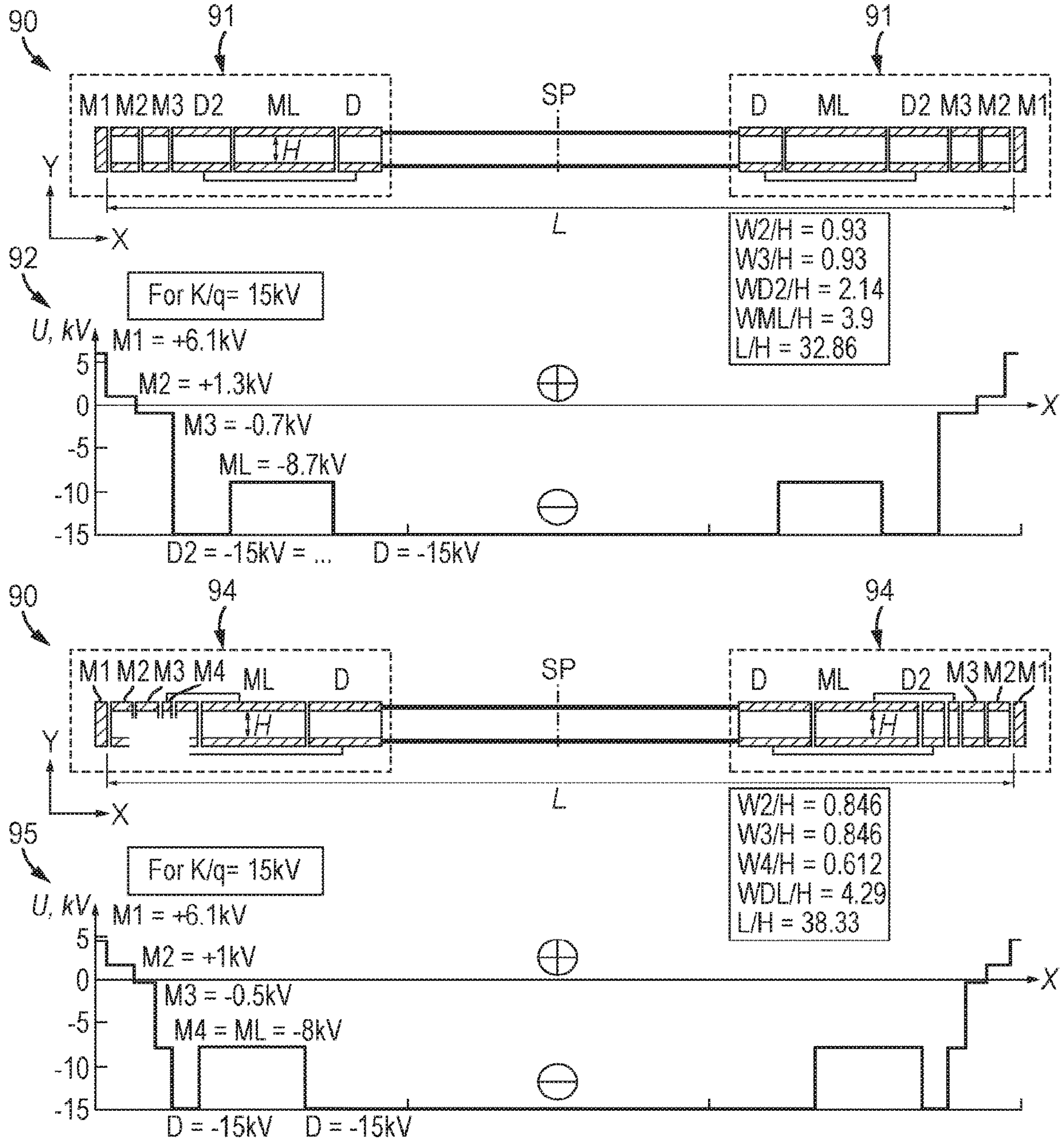
FIG. 9 shows examples of ion mirrors with retarding lens; such ion mirrors allow increasing acceleration potential $U_X$ for use of higher ion beam specific energies $U_Z$, producing lower ion packet divergence.

Referring to FIG. 9, and as described in a co-pending application, MRTOF 90 or 93 may be brought to 15 kV acceleration as well, if using retarding lens ML in ion mirrors. Then drift potential (also called acceleration potential) becomes the highest absolute voltage. Contrary to the prior art, the scheme with a retarding lens can be brought to third-order full isochronicity and up to fifth-order time per energy focusing, illustrated by numerical examples of electrode shapes and voltages for providing high order isochronicity. Thus, a straight oriented OA may be used at higher, but still realistic, MPTOF voltages without danger of electrical breakdown.

Figure 10:
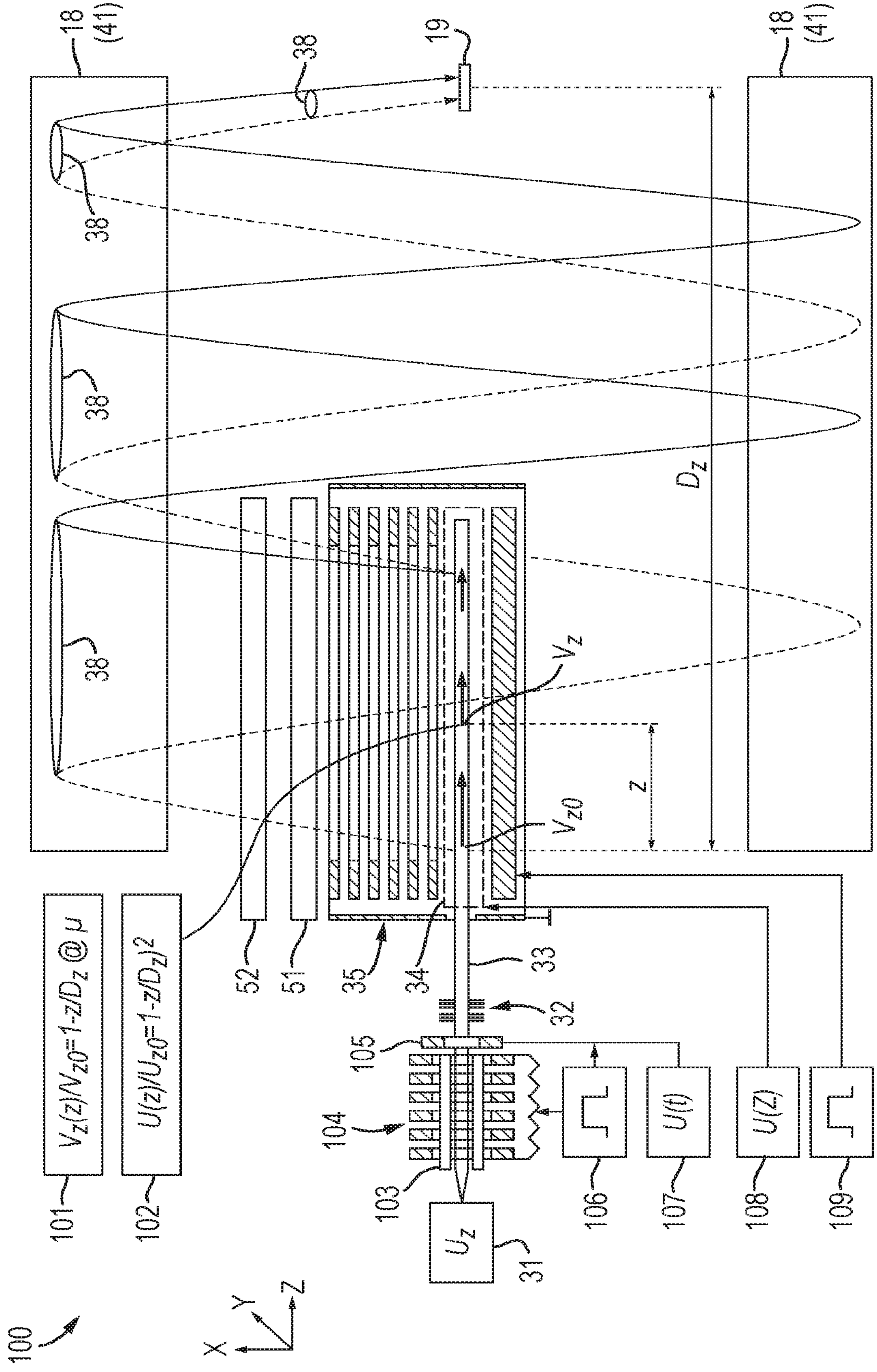
FIG. 10 illustrates the method of ion packet spatial focusing by arranging spatial to temporal correlation within the propagating continuous beam.

Z-focusing by spatial-temporal correlations: Controlling the axial velocity (in the Z-dimension) $V_Z$ of the continuous ion beam is proposed as an alternative or complimentary (to Z-focusing lens) method for arranging ion packet spatial Z-focusing within the MPTOF. Referring to FIG. 10, a group of Z-focusing means 100 according to an embodiment of the present invention is based on arranging a negative correlation between ion spatial Z-position z and of axial ion velocity $V_Z(z)$ within the storage gap 34 of the OA 35:

$$V_Z(z)/V_{Z0}=1-z/D_Z \qquad (7)$$

shown as condition 101, where $D_Z$ is the distance from beginning of the OA to the detector, $V_Z(z)$ is the axial velocity for μ=m/z ions of interest depending on the ions' z-position within the OA, and $V_{Z0}=V_Z(z=0)$.

To satisfy focusing conditions for a wide mass range (i.e. for all p), the z-dependent specific energy U(z) (energy per charge) shall satisfy:

$$U(Z)/U_{Z0}=(1-/D_Z)^2 \qquad (8)$$

shown as condition 102, where $U_{Z0}$=U(z=0)

Again referring to FIG. 10, an embodiment 100 with Z-focusing according to embodiments of the present invention is shown comprising an exemplary OA-MRT 30 with ion mirrors 18 and detector 19, and an orthogonal accelerator OA 35 with z-length $L_Z$ comparable to $D_Z$ analyzer Z-width (say, $L_Z/D_Z$ is from ¼ to ½). Substantially elongated ion beam 33 is retained within long OA 35 by spatial confinement means 34, e.g. as detailed in below FIG. 11 or FIG. 12. At least one pulse signal 109 is applied across the ion storage gap of OA. Similar to FIG. 3, OA 35 is followed by a dual Y-deflector 51 and 52 for the side bypassing of the OA.

To arrange the desired negative V(z) correlation (eq. 7) or U(z) correlation (eq. 8), the embodiment 100 further comprises at least one of the following means: an RF ion guide 103 with optional auxiliary electrodes 104 and an exit gate 105; a pulse generator 106; a time dependent U(t) signal generator 107; a symbolically shown resistive divider U(z) 108 for arranging Z-dependent deceleration 102 within confining means 34. Signals 106, 107 and 108 may be applied to any combination of electrodes: RF guide 103, and/or auxiliary electrodes 104, and/or exit gate 105, and/or ion optics 32.

In operation, continuous ion beam 33 is accelerated to specific energy $U_Z$ by floating of the ion source 31 and of RF ion guide 103. For some target μ=m/z ions of interest this corresponds to velocity $V_{Z0}$ in condition 101. The beam enters the OA 35 along the Z-axis and travels in the storage gap 34, being spatially confined by the below described confinement means 34. An $L_Z$ long portion of ion beam 33 is pulsed accelerated in the X direction and gets steered by the dual Y-deflector 51 and 52. Thus formed ion packets 38 are reflected by a set of parallel ion mirrors 18, while slowly drifting in the Z-direction to the detector 19. Note that embodiment 100 does not use a Z-focusing lens. Then the orthogonal ion X-motion in the MPTOF does not affect ion Z-motion, defined by the axial ion velocity within the OA, and, hence, the correlations of eq. 7 and eq. 8 control ion packet Z-focusing towards the detector.

If no Z-focusing means are used (like TA lens 68, Fresnel lens 75, or correlations 101 or 102), the ion packets 38 will remain long in the Z-direction, and most ions would either miss a short detector 19 or hit rims of a longer detector 19. The detected ions would correspond to various numbers of ion reflections, causing spectral overlaps and confusion at spectral interpretation.

In one method, to arrange ion packet z-focusing by arranging the correlation of eq. 7, an acceleration pulse 106 is applied to RF ion guide 103 (for example, a segmented quadrupole or an ion tunnel) or to auxiliary electrodes 104 (e.g. segmented or wedge electrodes) such as surrounding multipole rods, thus forming a pulsed axial Z-field. Alternatively, a negative pulse 106 is applied to gate 105, to follow the known Pulsar method. The pulse 106 amplitude and the length of axial Z-field within the guide 103 are arranged for time-of-flight compression of ion packets at detector 19, located at distance $D_Z$. Ions closer to the entrance of the axial acceleration Z-field will arrive at the OA 35 at a later time and at smaller z within the OA 35, but will have larger $V_Z$. This produces ion packet compression or bunching at the detector 19. Note that the desired Z-$V_Z$ correlation 101 occurs for a narrow mass p range only, controlled by the time delay between pulse 106 and OA pulse 109. The embodiment is attractive for target analysis, where a narrow mass range is selected intentionally, while TOF data may be acquired at maximal OA frequency and at maximal dynamic range of the MRTOF detector.

In another method, to arrange ion packet z-focusing by arranging the correlation of eq. 7, the potential of a field free elevator is controlled by the time variable floating U(t) 107 of either ion guide 103, or of ion optics 32. The effect of the time variable elevator is very similar to the above described bunching effect, though the elevator exit is set closer to the OA entrance and allows a somewhat wider m/z range.

In yet in another method, to arrange ion packet z-focusing by arranging the correlation of eq. 8, the beam 33 is slowed down within the confinement means 34 by arranging a Z-dependent axial potential distribution U(z) 108, e.g. by a resistive divider. Then the desired z-focusing of ion packets is achieved for the entire ionic mass range, i.e. occurs for ions of all p. The method 102 is particularly attractive when using the RF ion guide in the Pulsar mode, i.e. accumulating and pulse releasing ion packets from the guide 103, synchronized with pulses 109 of the OA.

Spatial confinement within OA: Substantial elongation of the orthogonal accelerator 35 would be useless if the ion beam expanded in the field free storage gap. Even with ion beam dampening in RF only ion guides, the ion beam emittance is still finite, and the ion beam would naturally diverge a few degree, thus expanding by several mm in a 100-200 mm long OA. This would strongly compromise the combination of time and energy spreads of ion packets, affecting MPTOF resolution.

Figure 11:
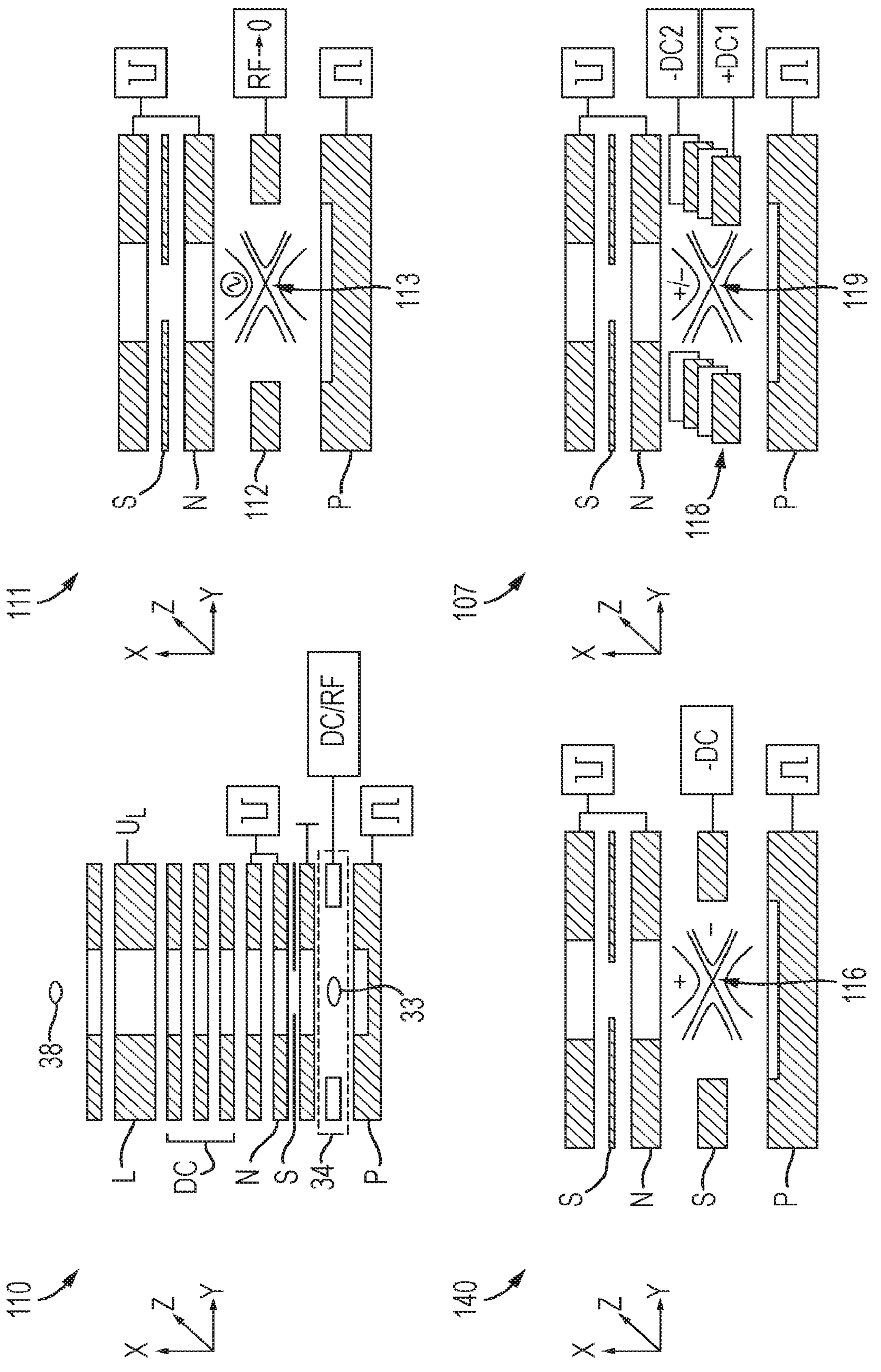
FIG. 11 illustrates various methods of ion beam spatial confinement within the storage gap of the elongated orthogonal accelerator.
Figure 12:
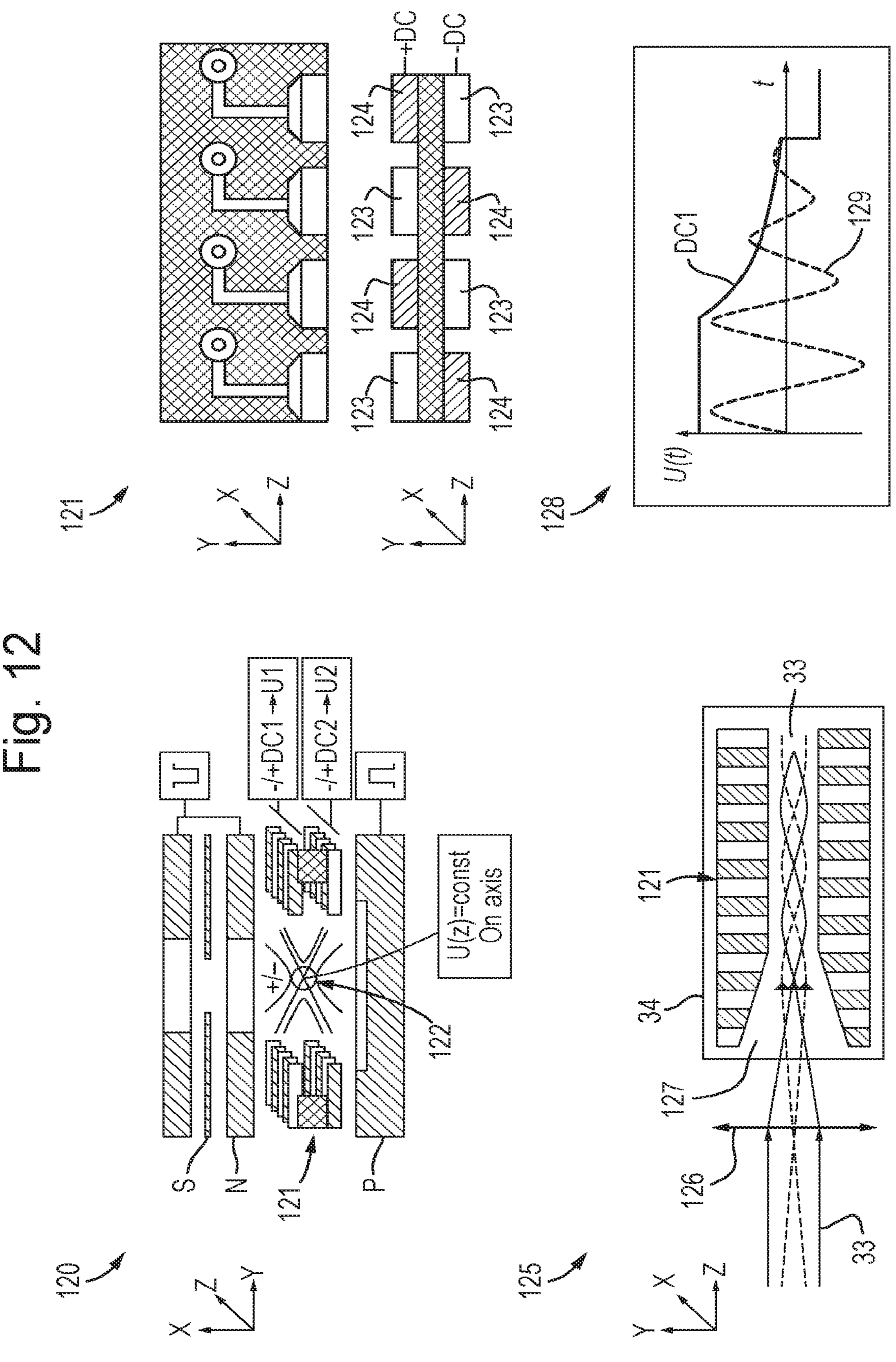
FIG. 12 shows an embodiment with ion beam confinement by novel electrostatic guide built of spatially alternated DC dipoles.

Referring to FIG. 11, embodiment 110 presents a gridless orthogonal accelerator (OA, previously denoted as 35) with generalized means 34 for spatial confinement of the ion beam 33. Embodiment 100 comprises the typical slit electrodes of a gridless OA: positively pulsed push P electrode, a grounded electrode, negatively pulsed pull N electrodes, a slit S between two pull electrodes for trimming excessively wide ion packets, a DC acceleration stage DC and a lens L for terminating the DC field at nearly zero ion packet divergence in the XY-plane. Electrical pulses P and N are used to convert continuous ion beam 33 into pulsed packets 38. Generalized means 34 are shown as symbolic electrodes within the OA storage gap between push P electrode and grounded electrode. Means 34 are energized by either RF and/or DC signals. Details of means 34 vary between the embodiments of FIG. 11 and FIG. 12.

The known embodiment 111 employs a rectilinear RF trap, arranged by applying an RF signal to electrodes 112, similar to U.S. Pat. No. 5,763,878. The RF field generates a quadrupolar RF field 113, radially confining the ion beam 33. The embodiment 111 has several drawbacks. The RF confinement is known to be mass dependent. Besides, the RF field shall be turned off when the acceleration pulse is applied. To avoid expansion of the ion cloud the switching time is limited to microseconds, where the RF signal decay is incomplete. Finally, pulses applied to push P and pull N electrodes are known to excite a resonant generator of the RF signal. Initial ion position and initial velocity are mass and RF-phase dependent, which affects resolution, mass accuracy and angular losses in TOF analyzers. Thus, the scheme 111 with RF confinement is compromised.

Another known embodiment 114 employs a rectilinear electrostatic quadrupolar lens, formed by applying a negative DC potential to electrodes 105, as proposed in RU2013149761. A weak electrostatic quadrupolar field 116 focuses and confine the ion beam in the critical TOF X-direction, while defocusing the ion beam in the non-critical transverse Y-direction. At pulsed ion extraction, the DC potential on electrodes 115 can be switched off or adjusted for better spatial focusing and for time-of-flight focusing of ion packets 38. The method allows lossless ion packets elongation up to $L_Z$<50 mm. Though method 114 is still considered as useful at $L_Z$ up to 100 mm, the ion packet elongation above 50 mm would produce ion losses on the slit S.

Referring to FIG. 10, an embodiment 107 of the present invention employs the spatially alternated electrostatic DC quadrupolar field 119 along the Z-axis by alternating the polarity on DC electrodes 118. The embodiment provides for indefinite ion beam confinement in both the X and Y directions, though at variable central potential along the Z-axis, which is expected to produce a negative effect on ion beam packet focusing in the Z-direction.

Novel DC quadrupolar confinement: Referring to FIG. 12, novel and further improved embodiment 120 of the present invention provides for ion beam spatial confinement by spatial alternation of electrostatic quadrupolar field 122, now achieved without spatial modulation of the center-line potential U(z). The field is formed by an array of alternated DC dipoles, composed of electrodes 123 and 124, for example, connected to a double-sided PCB 121. Two DC potentials DC1 and DC2 are connected through displaced PCB vias. Preferably, the average potential (DC1+DC2)/2 is slightly negative to form a combination of the alternated quadrupolar field 122 with a weak static quadrupolar field, thus providing somewhat stronger compression of the ion beam 33 in the X-direction Vs Y-direction.

The novel electrostatic quadrupolar ion guide 120 provides for indefinite ion beam confinement, so far being achieved only in prior art RF confinement, shown in the embodiment 121. Relative to RF confinement, the novel electrostatic confinement provides multiple advantages: it is mass independent; it does not require resonant RF circuits and can be readily switched; the strength and shape of the transverse confining field can be readily varied along the guide length; it can provide axial gradient of the guide potential without constructing complex RF circuits.

The embodiment 120 is further improved by a phase-space balancing of the incoming ion beam 33. The view 125 shows an exemplary upstream electrostatic lens 126 for adjusting the balance between the width and the angular divergence of the incoming ion beam 33, so that each of the phase space components (width and angular divergence) would be producing about the same spatial spreading of the confined ion beam 33 within the OA storage gap.

The embodiment 120 is further improved by arranging so-called "adiabatic entrance" 125 and "adiabatic exit" 128 conditions for ion beam 33. For adiabatic entrance 125, there is arranged a smooth rise of quadrupolar DC field, spread for at least 2-3 spatial periods of DC field alternation. The smooth rise of quadrupolar field may be arranged either by the illustrated Y-spreading of the PCB board 121, or by narrowing of the storage gap between electrodes N and P in the X-direction, or by arranging a spatial gradient of DC voltages on the PCB board 121, say with resistive divider.

For "adiabatic exit" 128 of ions from the entire storage gap at pulsed extraction of ion packets, the invention proposes the gradual switching of DC1 and DC2 potentials, as shown by the DC1(t) graph. The switching time shall correspond to ion passage through several DC alternations, as shown by time variation 129 of quadrupolar field for some probe ion being transversely remote from the axis of quadrupolar field 122. The adiabatic switching would reduce the energy of "micro-motion" within the confined ion beam 33. The adiabatic effects are very similar to spatially adiabatic entrance and exit fields arranged in conventional RF ion guides.

Electrostatic quadrupolar guide 120 may be further improved: the guide 120 may be seamless extending beyond the ion OA ion storage gap of electrodes N and P to serve as an intermediate ion optics for guiding ions from gaseous RF ion guides or past ion optics, already forming nearly parallel ion beam. The external portion of guide 120 may be gently curved at radiuses much larger than the distance between pair of PCB 121, or may pass through a wall, separating differentially pumped stages.

Embodiment 120 presents an example of non compromised confining means 34, which now allow substantial (potentially indefinite) extension of OA length $L_Z$ and also allows varying axial potential U(z) as in FIG. 10 to achieve full advantage of the present invention. Using RF ion guides in Pulsar mode (as in FIG. 10) now allows reaching nearly unity duty cycle for wide mass range.

RF trap converters: Most of the proposed solutions are also applicable to pulsed converters based on radiofrequency (RF) ion trap with radial pulsed ejection. The converters are then improved by their substantial elongation, which improves the space charge capacity of the converters. Elongation of ion packets within MPTOF helps improving space charge capacity of MPTOF analyzers.

Figure 13:
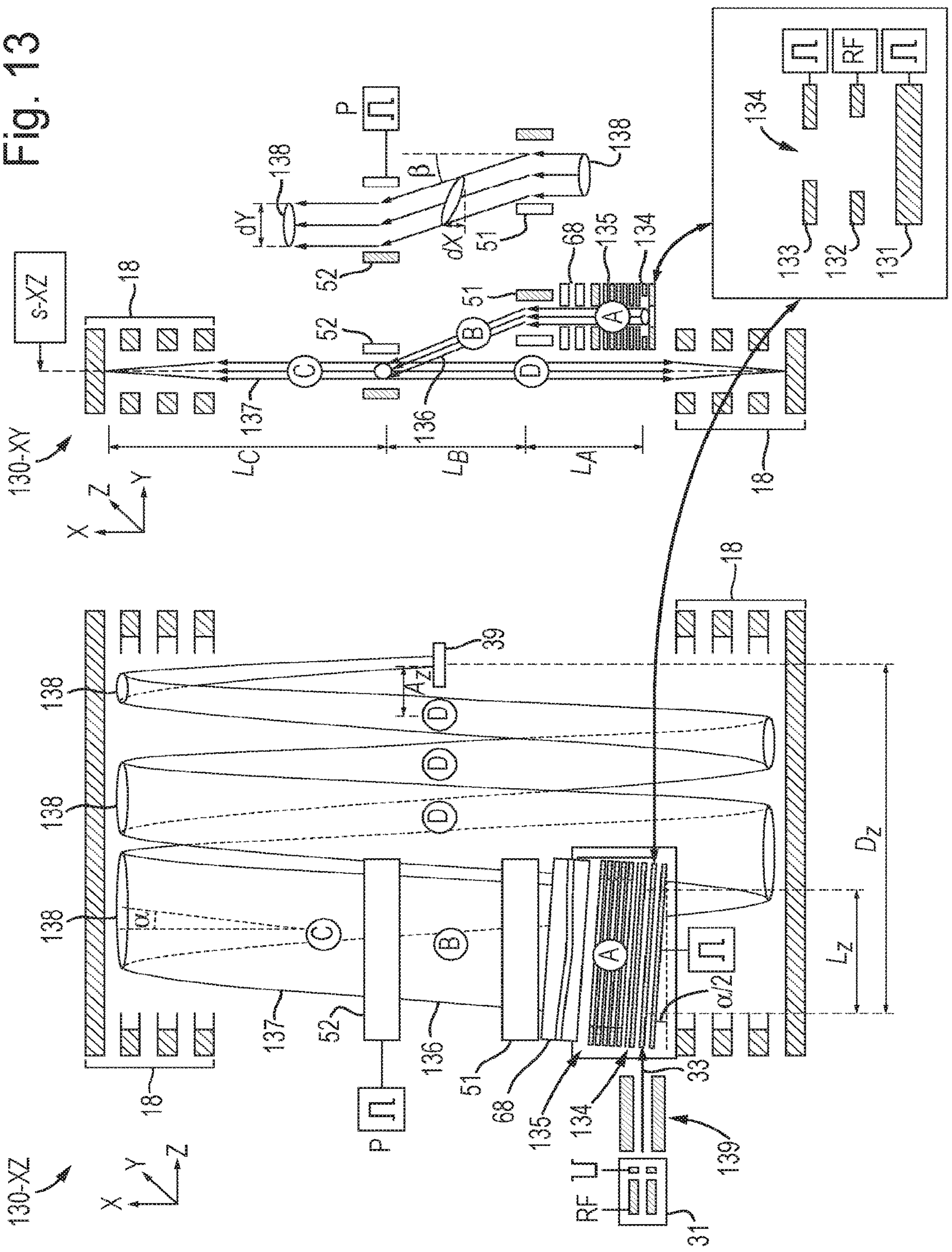
FIG. 13 shows a trap-MRTOF embodiment of the present invention, improving the space charge capacity of RF ion trap with radial ejection by steps of trap elongation, bypassing the trap by side packet deflection, by ion steering at an inclination angle within the MPTOF, arranged isochronously at tilting the trap, and by spatial focusing of ion packets towards a TOF detector

Referring to FIG. 13, the OA-MRTOF embodiment 130 of the present invention comprises: a continuous ion source 31; an RF ion guide 139 to transfer a continuous ion beam 33; a radially ejecting (in the X-direction) ion trap 134 with transverse radio-frequency (RF) ion confinement; an DC accelerating stage 135; an isochronous trans-axial lens 68, preferably tilted to form a trans-axial wedge; a set of dual Y-deflectors 51 and 52 (detailed in FIG. 5); a pair of parallel gridless ion mirrors 18, separated by a floated field-free drift space; and a TOF detector 39. Electrodes of OA 35 and of ion mirrors 18 are substantially elongated in the drift Z-direction to provide a two-dimensional electrostatic field in the X-Y plane, symmetric around s-XZ symmetry plane of isochronous trajectory surface and having zero field component in the Z-direction. Preferably, ion source 31 comprises an RF ion guide with pulsed exit gate, denoted by RF and by pulse symbol.

In operation, a continuous or quasi-continuous ion source 31 generates ions. RF ion guide 139 transfers ions between differentially pumped stages and delivers ions into the radially ejecting trap 134. Trap 134 forms a rectilinear RF ion guide with electrodes 131, 132 and 133, where RF signal is applied to middle electrodes 132. The trap is substantially elongated in the drift Z-direction for extending the space charge capacity. Ions enter the trap 134 and are confined by RF signal. Ions are axially confined by electrostatic plugs, either separate electrodes, or DC bias segments, extending electrodes 131, 132 and 133. Preferably, ions energy is dampened in gas collisions at gas pressures of 1 mTorr pressure range and ions are stored in trap 134 for several ms time, sufficient for dampening. Alternatively, ion flow is passing through the trap 134 (in the Z-direction) at low energies of about 1 eV range.

Periodically, electrical pulses are applied to electrode 131 and 133 for ejecting stored ions in the X-direction. Preferably, RF signal to plates 132 is switched off, at an experimentally optimized RF phase. Preferably, there a time delay between RF switching off (on plate 132) and ejection pulses (to plates 131 and 133). Preferably, said time delay is optimized, depending on the mass range of the analysis. As a result, the trap ejects ion packets 138, elongated in the Z-direction, The trajectories (rays) of ejected ion packets passed the trap are either orthogonal to electrodes 131-133 (in case of ion gaseous dampening), or inclined at very small angle of few mrad (in case of ion beam passing through the trap at 1 eV energy). In both cases, the inclination of trajectories are insufficient for ion advancing within the MPTOF. To arrange sufficient inclination angle $\alpha$ or trajectories 136 and 137, the trap 134 is tilted to the Z-axis by the angle $\lambda=\alpha/2$, and ion rays are inclined by a trans-axial wedge, built into the trans-axial lens 68. The wedge properties may be arranged just by tilting of the lens 68. The combination of the trap 134 tilt and ion ray steering is known to compensate for the time front tilting. Alternatively, and as described in a co-pending application, a wedge accelerating field is formed within the RF trap 134, say by very slight tilt of electrode 131 at very small angle, expected being of about $\lambda=\alpha/10$.

Ejected ion packets 138 move at some inclination angle $\alpha$, controlled by tilt angle of RF trap 134 or of accelerating electrodes 131, 132 or 133. Ion packets are reflected between ion mirrors 18 in the X-direction within the s-XZ symmetry plane for large number of reflections (say N=10) and while drifting towards the detector 19 because of the defined inclination angle $\alpha$.

Pulsed displacement: To avoid the ion packet interference, the trap 134 and accelerator 135 are Y-displaced from the s-XZ symmetry plane of ion mirrors 18. The ions initially follow ion path A along the axis of trap 134. Then ion packets are then pulsed displaced to the tilted path B of ion trajectory 137 arranged with static deflector 38, then to path C with pulsed deflector 39, and then ions naturally continue to path D. Paths C and D are aligned within the s-XZ symmetry plane of ion mirrors 18 to provide for isochronous ion motion. The dual deflection is arranged to eliminate first-order time front steering dX=0 of ion packets 138, as detailed in FIG. 5.

Isochronous Z-focusing of ion packets: To avoid ion losses on the detector 19, so as to avoid spectral overlaps and spectral confusion (contrary to prior art open traps, described in WO2011107836), the ion packets 138 are spatially focused in the Z-direction by a trans-axial lens 68 in FIG. 6, or by Fresnel lens 75 in FIG. 7, or by spatial space-velocity correlation within the trap in case of passing through ion beam, as described in FIG. 10. It is of importance that the Z-focusing is arranged isochronous, i.e. with compensation of T|Z and T|ZZ time aberrations per Z-width of ion packets, which otherwise would occur if using a conventional Einzel lens. Preferably, spatial Z-focusing may be further complemented by measures, reducing ion packet angular divergence, as described in FIG. 8 and FIG. 9.

For the avoidance of doubt, the time front of the ions described herein may be considered to be a leading edge/area of ions in the ion packet having the same mass to charge ratio (and which may have the mean average energy).

Annotations

Coordinates and Times:

x,y,z—Cartesian coordinates;

X, Y, Z—directions, denoted as: X for time-of-flight, Z for drift, Y for transverse;

$Z_0$—initial width of ion packets in the drift direction;

ΔZ—full width of ion packet on the detector;

$D_X$ and $D_Z$—used height (e.g. cap-cap) and usable width of ion mirrors

L—overall flight path

N—number of ion reflections in mirror MRTOF or ion turns in sector MTTOF u—x-component of ion velocity;

w—z-component of ion velocity;

T—ion flight time through TOF MS from accelerator to the detector;

ΔT—time spread of ion packet at the detector;

Potentials and Fields:

U—potentials or specific energy per charge;

$U_Z$ and $\Delta U_Z$—specific energy of continuous ion beam and its spread;

$U_X$—acceleration potential for ion packets in TOF direction;

K and ΔK—ion energy in ion packets and its spread;

δ=ΔK/K—relative energy spread of ion packets;

E—x-component of accelerating field in the OA or in ion mirror around "turning" point;

μ=m/z—ions specific mass or mass-to-charge ratio;

Angles:

α—inclination angle of ion trajectory relative to X-axis;

Δα—angular divergence of ion packets;

γ—tilt angle of time front in ion packets relative to Z-axis

λ—tilt angle of "starting" equipotential to axis Z, where ions either start accelerating or are reflected within wedge fields of ion mirror θ—tilt angle of the entire ion mirror (usually, unintentional);

φ—steering angle of ion trajectories or rays in various devices;

ψ—steering angle in deflectors

ε—spread in steering angle in conventional deflectors;

Aberration Coefficients

T|Z, T|ZZ, T|δ, T|δδ, etc;

indexes are defined within the text

Although the present invention has been describing with reference to preferred embodiments, it will be apparent to those skilled in the art that various modifications in form and detail may be made without departing from the scope of the present invention as set forth in the accompanying claims.

The invention claimed is:

1. A time-of-flight mass analyser comprising:

at least one ion mirror for reflecting or turning ions in a first dimension (X-dimension);

an ion accelerator for pulsing ion packets into the ion mirror; and an ion detector;

wherein the mass analyser comprises focusing electrodes arranged and configured to control the motion of ions in a second dimension (Z-dimension) orthogonal to the first dimension so as to spatially focus each of the ion packets so that it becomes continuously smaller in the second dimension along the whole of the distance it travels, in the second dimension, from one end of the mass analyser to the other end of the mass analyser.

2. The mass analyser of claim 1, wherein the ion accelerator is a radio-frequency ion trap converter.

3. The mass analyser of claim 1, wherein the focusing electrodes are configured to impart ions located at different positions, in the second dimension, within the ion packet with different velocities in the second dimension so as to perform the spatial focusing.

4. The mass analyser of claim 1, wherein the focusing electrodes comprise a plurality of electrodes configured to generate an electric field region through which ions travel in use that has equipotential field lines that diverge as a function of position along the second dimension (Z-direction) so as to focus ions in the second dimension.

5. The mass analyser of claim 1, wherein the focusing electrodes are spaced apart from each other in the first dimension by a gap, wherein the gap is elongated in the second dimension and the longitudinal axis of the gap curves in a plane defined by the first and second dimensions (X-Z plane).

6. The mass analyser of claim 5, wherein the ion accelerator comprises a puller electrode configured to pull ions in the first dimension when pulsing ion packets in the first dimension; wherein the puller electrode is curved in the plane defined by the first and second dimensions (X-Z plane) and in the opposite direction to the curvature of the focusing electrodes.

7. The mass analyser of claim 1, comprising an ion guide or ion trap upstream of the ion accelerator and one or more electrodes configured to pulse ions out of the ion guide or ion trap such that the ions arrive at the ion accelerator.

8. The mass analyser of claim 7, comprising a controller that synchronises the pulsing of ions out of the ion guide or ion trap with the pulsing of ion packets out of the ion accelerator.

9. The mass analyser of claim 8, wherein the controller is configured to provide a time delay between the pulsing of ions out of the ion guide or ion trap and the pulsing of ion packets out of the ion accelerator.

10. The mass analyser of claim 1, wherein the ion accelerator comprises an ion guide portion having electrodes arranged to receive ions, and one or more voltage supplies configured to apply potentials to these electrodes for confining ions in at least one dimension (X- or Y-dimension) orthogonal to the second dimension.

11. The mass analyser of claim 1, wherein the mass analyser is a multi-reflecting time of flight mass analyser having two ion mirrors that are elongated in the second dimension (z-dimension) and configured to reflect ions multiple times in the first dimension (x-dimension), wherein the ion accelerator is arranged to receive ions and accelerate them into one of the ion mirrors.

12. The mass analyser of claim 11, wherein the electrodes are arranged and configured to reflect or turn ions multiple times between the ion mirrors in an oscillation plane defined by the first and second dimensions as the ions drift in the second dimension, and further comprising a first ion deflector arranged and configured to deflect ions in the third dimension.

13. The mass analyser of claim 1, wherein the length of the ion accelerator from which ions are pulsed (Lz) is longer, in the second dimension, than half of the distance (Az) that the ion packet advances for each mirror reflection.

14. A time-of-flight mass spectrometer comprising:

at least one ion mirror for reflecting or turning ions in a first dimension (X-dimension);

an ion accelerator for pulsing ion packets into the ion mirror;

an ion detector; and an ion guide being part of the ion accelerator and having electrodes arranged to receive ions travelling along a first axis (Z-dimension), including a plurality of DC electrodes spaced along the first axis, and DC voltage supplies configured to apply different DC potentials to alternate ones of said DC electrodes such that when ions travel through the ion guide along the first axis they experience an ion confining force, generated by the DC potentials, in at least one dimension (X- or Y-dimension) orthogonal to the first axis.

15. The mass spectrometer of claim 14, wherein the DC voltage supplies are configured to apply DC potentials having opposite polarities to alternate ones of said DC electrodes.

16. A time-of-flight mass analyser comprising:

at least one ion mirror for reflecting ions in a first dimension (X-dimension);

an ion accelerator for pulsing ion packets into the ion mirror; and an ion detector;

wherein the mass analyser comprises focusing electrodes that are spaced apart from each other in the first dimension by a gap, wherein the gap is elongated in a second dimension (Z-dimension) that is orthogonal to the first dimension, and wherein the longitudinal axis of the gap curves.

17. The mass analyser of claim 16, wherein the focusing electrodes are arranged and configured to control the motion of ions in the second dimension so as to spatially focus each of the ion packets in the second dimension.

18. A method of mass spectrometry comprising:

providing a mass analyser as claimed in claim 1;

receiving ions in said ion accelerator;

pulsing ions from said ion accelerator into said ion mirror; and receiving ions at said detector.

* * * * *